US005996036A

United States Patent [19]

Kelly

[11] Patent Number: 5,996,036
[45] Date of Patent: Nov. 30, 1999

[54] BUS TRANSACTION REORDERING IN A COMPUTER SYSTEM HAVING UNORDERED SLAVES

[75] Inventor: James D. Kelly, Aptos, Calif.

[73] Assignee: Apple Computers, Inc., Cupertino, Calif.

[21] Appl. No.: 08/779,632

[22] Filed: Jan. 7, 1997

[51] Int. Cl.[6] .............................. G06F 9/46; G06F 13/36; G11C 7/00
[52] U.S. Cl. .......................... 710/110; 710/107; 709/208
[58] Field of Search .................................... 710/110, 107, 710/263, 41, 52; 711/151; 709/100–102, 208

[56] References Cited

U.S. PATENT DOCUMENTS

| | | | |
|---|---|---|---|
| 4,181,974 | 1/1980 | Lemay et al. | 364/900 |
| 4,473,880 | 9/1984 | Budde et al. | 364/200 |
| 4,965,716 | 10/1990 | Sweeney | 364/200 |
| 5,006,982 | 4/1991 | Ebersole et al. | 710/263 |
| 5,191,649 | 3/1993 | Cadambi et al. | 395/200 |
| 5,257,356 | 10/1993 | Brockmann et al. | 395/725 |
| 5,287,477 | 2/1994 | Johnson et al. | 395/425 |
| 5,327,538 | 7/1994 | Hamaguchi et al. | 395/325 |
| 5,345,562 | 9/1994 | Chen | 395/275 |
| 5,375,215 | 12/1994 | Hanawa et al. | 395/425 |
| 5,473,762 | 12/1995 | Krein et al. | 395/287 |
| 5,592,631 | 1/1997 | Kelly et al. | 395/293 |
| 5,682,512 | 10/1997 | Tetrick | 711/202 |
| 5,822,772 | 10/1998 | Chan et al. | 711/158 |

Primary Examiner—Gopal C. Ray
Attorney, Agent, or Firm—Burns, Doane, Swecker & Mathis, L.L.P.

[57] ABSTRACT

A mechanism is provided for reordering bus transactions to increase bus utilization in a computer system in which a split-transaction bus is bridged to a single-envelope bus. In one embodiment, both masters and slaves are ordered, simplifying implementation. In another embodiment, the system is more loosely coupled with only masters being ordered. Greater bus utilization is thereby achieved. To avoid deadlock, transactions begun on the split-transaction bus are monitored. When a combination of transactions would, if a predetermined further transaction were to begin, result in deadlock, this condition is detected. In the more tightly coupled system, the predetermined further transaction, if it is requested, is refused, thereby avoiding deadlock. In the more loosely-coupled system, the flexibility afforded by unordered slaves is taken advantage of to, in the typical case, reorder the transactions and avoid deadlock without killing any transaction. Where a data dependency exists that would prevent such reordering, the further transactions is killed as in the more tightly-coupled embodiment. Data dependencies are detected in accordance with address-coincidence signals generated by slave devices on a cache-line basis. In accordance with a further optimization, at least one slave device (e.g., DRAM) generates page-coincidence bits. When two transactions to the slave device are to the same address page, the transactions are reordered if necessary to ensure that they are executed one after another without any intervening transaction. Latency of the slave is thereby reduced.

17 Claims, 21 Drawing Sheets

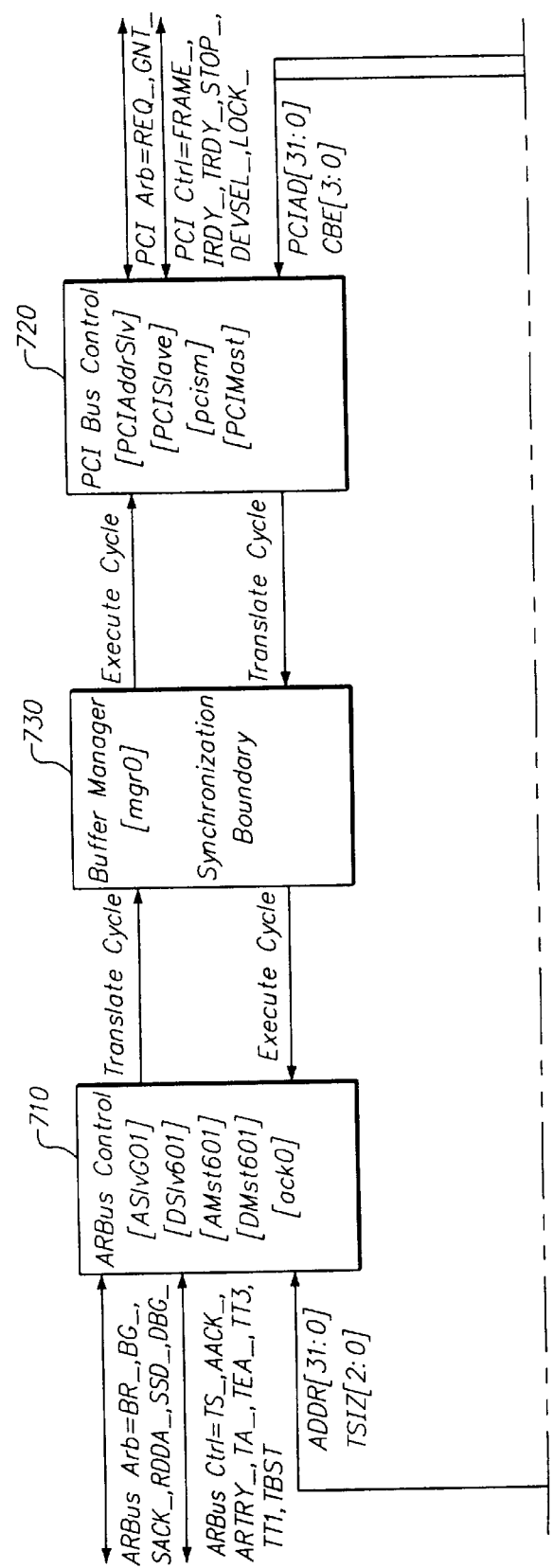

BUS TRANSACTION REORDERING IN A COMPUTER SYSTEM HAVING UNORDERED SLAVES

FIELD OF THE INVENTION

The present invention relates to computer architecture, in particular to computer architecture for small computer systems such as personal computers.

STATE OF THE ART

The PowerPC computer architecture, co-developed by Apple Computer, represents a departure from prior-generation small computer architectures. PowerPC machines currently sold by Apple are based largely on the Motorola MPC601 RISC microprocessor. Other related processors, including the MPC 604, MPC 603, MPC 603e, and MPC 602 are currently available and additional related processor including the MPC 620 will be readily available in the future. The MPC60x permits separate address bus tenures and data bus tenures, where tenure is defined as the period of bus mastership. In other words, rather than considering the system bus as an indivisible resource and arbitrating for access to the entire bus, the address and data buses are considered as separate resources, and arbitration for access to these two buses may be performed independently. A transaction, or complete exchange between two bus devices, is minimally comprised of an address tenure; one or more data tenures may also be involved in an exchange. There are two kinds of transactions: address/data and address-only.

A tenure consists of three phases: arbitration, transfer, and termination. During termination, a signal occurs that marks the end of the tenure. The same signal is used to acknowledge the transfer of an address or data beat. A beat corresponds generally to a particular state of the address bus or the data bus. Transfers include both single-beat transfers, in which a single piece of data is transferred, and burst data transfers, in which a burst of four data beats is transferred.

Referring more particularly to FIG. 1, note that the address and data tenures are distinct from one another and that both consist of three phases—arbitration, transfer, and termination. FIG. 1 shows a data transfer that consists of a single-beat transfer (up to 64 bits). In a four-beat burst transfer, by contrast, data termination signals are required for each beat of data, but re-arbitration is not required. Having independent address and data tenures allows address pipelining (indicated in FIG. 1 by the fact that the data tenure begins before the address tenure ends) and split-bus transactions to be implemented at the system level. Address pipelining allows new address bus transactions to begin before the current data bus transaction has finished by overlapping the data bus tenure associated with a previous address bus tenure with one or more successive address tenures. Split-bus transaction capability allows the address bus and data bus to have different masters at the same time.

For clarity, the basic functions of address and data tenures will be discussed in somewhat greater detail.

In the case of address tenure, during address arbitration, address bus arbitration signals are used to gain mastership of the address bus. Assuming the CPU to be the bus master, it then transfers the address on the address bus during the address transfer phase. The address signals, together with certain transfer attribute signals discussed in greater detail hereinafter, control the address transfer. After the address transfer phase, the system uses the address termination phase to signal that the address tenure is complete or that it must be repeated.

In the case of data tenure, during address arbitration, the CPU arbitrates for mastership of the data bus. After the CPU is the bus master, during the data transfer phase, it samples the data bus for read operations or drives the data bus for write operations. Data termination signals occur in the data termination phase. Data termination signals are required after each data beat in a data transfer. In a single-beat-transaction, the data termination signals also indicates the end of the tenure, while in burst accesses, the data termination signals apply to individual beats and indicate the end of the tenure only after the final data beat.

Address-only transfers use only the address bus, with no data transfer involved. This feature is particularly useful in multi-master and multiprocessor environments, where external control of on-chip primary caches and TLB (translation look-aside buffer) entries is desirable. Additionally, the MPC60x provides a retry capability that supports an efficient "snooping" protocol for systems with multiple memory systems (including caches) that must remain coherent.

Pipelining and split-bus transactions, while they do not inherently reduce memory latency, can greatly improve effective bus-memory throughput. The MPC60x bus protocol does not constrain the maximum number of levels of pipelining that can occur on the bus between multiple masters. In a system in which multiple devices must compete for the system bus, external arbitration is required. The external arbiter must control the pipeline depth and synchronization between masters and slaves.

In a traditional pipelined implementation, data bus tenures are kept in strict order with respect to address tenures. However, external hardware can further decouple the address and data buses, allowing the data tenures to occur out of order with respect to the address tenures. Second-generation PowerPC computers include computers whose architecture was especially designed for high performance and that incorporated such hardware. This architecture supports true split-bus operation with ordered slaves and ordered masters. "Ordered" means each master and each slave has its own independent FIFO structure supporting "ordered" service to transactions posted to it. If a slave receives three transactions A, B, and C, then it will respond to A first, B second, and C third. If a master performs transactions D, E, and F, then it expects servicing of those transactions in the order of D first, E second, and F third. There can be up to a selected number of outstanding master/slave pair transactions in the architecture at one time. In one preferred embodiment, this selected number is three outstanding pair transactions. As a result, in the foregoing architecture, an expansion bridge may concurrently have one outstanding slave transaction to it and one outstanding master transaction from it. Although ordered masters and slaves, as opposed to unordered masters and slaves, provide an overall simplification to system architecture, they can lead to deadlocks when there are conflicting completion dependencies.

Deadlock occurs in a computer system when one resource cannot complete an access to another resource, and the access blocks other resources from performing transactions on the bus. Livelock occurs in a computer system when one resource cannot complete an access to another resource, does not block resources from performing transactions on the bus, but no forward progress can be made due to the resource's inability to complete its access.

Due to the plethora of design methodologies and implementations utilized by expansion card vendors, systems are most prone to deadlocks and livelocks when there is an expansion bridge in the system. Some potential deadlocks may be detected and prevented at the bridge level; however, other pieces of the overall solution may need to be implemented at a higher level in system arbitration.

The main reason that a deadlock or livelock occurs is that each of two different resources that communicate with each other assumes that it has top priority in the system. Unfortunately, when they communicate with each other this causes a conflict, and if one does not back off its access, the end result is deadlock or livelock.

In the architecture of certain Power PC computers of the assignee, the top priority bus is known as the ARBus; it is the one bus assumed to never have to back off an access. However, there may be a need for the ARBus to communicate with an ISA bus behind an expansion bridge. As history recalls, the ISA bus design assumed that any initiated access would complete; therefore, an ISA master would not have to back off its access. Therein lies the problem. The Power PC architecture, in one instance, chose the ARBus to be the bus to not back off, and the PC-world chose the ISA bus to be the bus to not back off. This conflict of interest could result in deadlock.

In another instance, the Power PC architecture may incorporate a PCI bus-to-PCI bus ("PCI2PCI") bridge having an interlocking behavior that disallows access to its slave port on one side of the PC12PCI bridge while its master on the same side of the PCI2PCI bridge has a transaction to perform. This behavior also means that the PCI2PCI bridge assumes that it does not have to be backed off, and any communication between the ARBus and a target behind the PCI2PCI bridge could result in deadlock.

Although decoupling the address and data buses in a computer system enables bus utilization to be greatly increased, it would be desirable to further increase bus utilization beyond what can reasonably be achieved in a system having both ordered masters and ordered slaves. Especially desirable would be a computer architecture in which bus utilization is increased and in which deadlocks are more readily avoided.

SUMMARY OF THE INVENTION

A mechanism is provided for reordering bus transactions to increase bus utilization in a computer system in which a split-transaction bus is bridged to a single-envelope bus. In one embodiment, both masters and slaves are ordered, simplifying implementation. In another embodiment, the system is more loosely coupled with only masters being ordered. Greater bus utilization is thereby achieved. In accordance with one embodiment of the invention, a queuing structure includes multiple master queues and multiple slave queues. The queuing structure receives bus grant signals and respective slave acknowledge signals from respective slave devices. Each time an address bus grant is issued a record is entered in the queuing structure, the record comprising a first entry in a master queue identified by the address bus grant signals, and a second entry in a slave queue identified by the slave acknowledge signals. The first entry identifies a target slave device in accordance with the slave acknowledge signals, and the second entry identifies an originating master device in accordance with the address bus grant signals. A matching circuit is responsive to queue entries from the queuing structure for producing match bits identifying selected records the first entry of which is at the head of a master queue. A data arbitration circuit is responsive to the match bits and to queue entries from the queuing structure for generating data bus grant signals for the master devices and for generating for each slave device a multibit signal which when active identifies a transaction within the transaction queue of the slave device.

DESCRIPTION OF THE DRAWINGS

The present invention may be further understood from the following description in conjunction with the appended drawing. In the drawing.

DETAILED DESCRIPTION OF THE INVENTION

In the following description, the system architecture of a computer system in which the present invention may be used will first be described, including a description of the MPC601 bus, the ARBus, which is a superset of the MPC601 bus, a system arbiter and an expansion bridge. Deadlock avoidance will then be described, beginning with a description of the types of deadlocks and livelocks that may occur in the system, followed by a description of specific deadlock and livelock situations for both a system having a single expansion bridge and a system having two or more expansion bridges. Rules will be identified for avoiding deadlock. These rules will then be summarized, both for the case of a single expansion bridge and for the case of two or more expansion bridges. Finally, the manner in which the rules are implemented in the system will be described.

Figure 2:
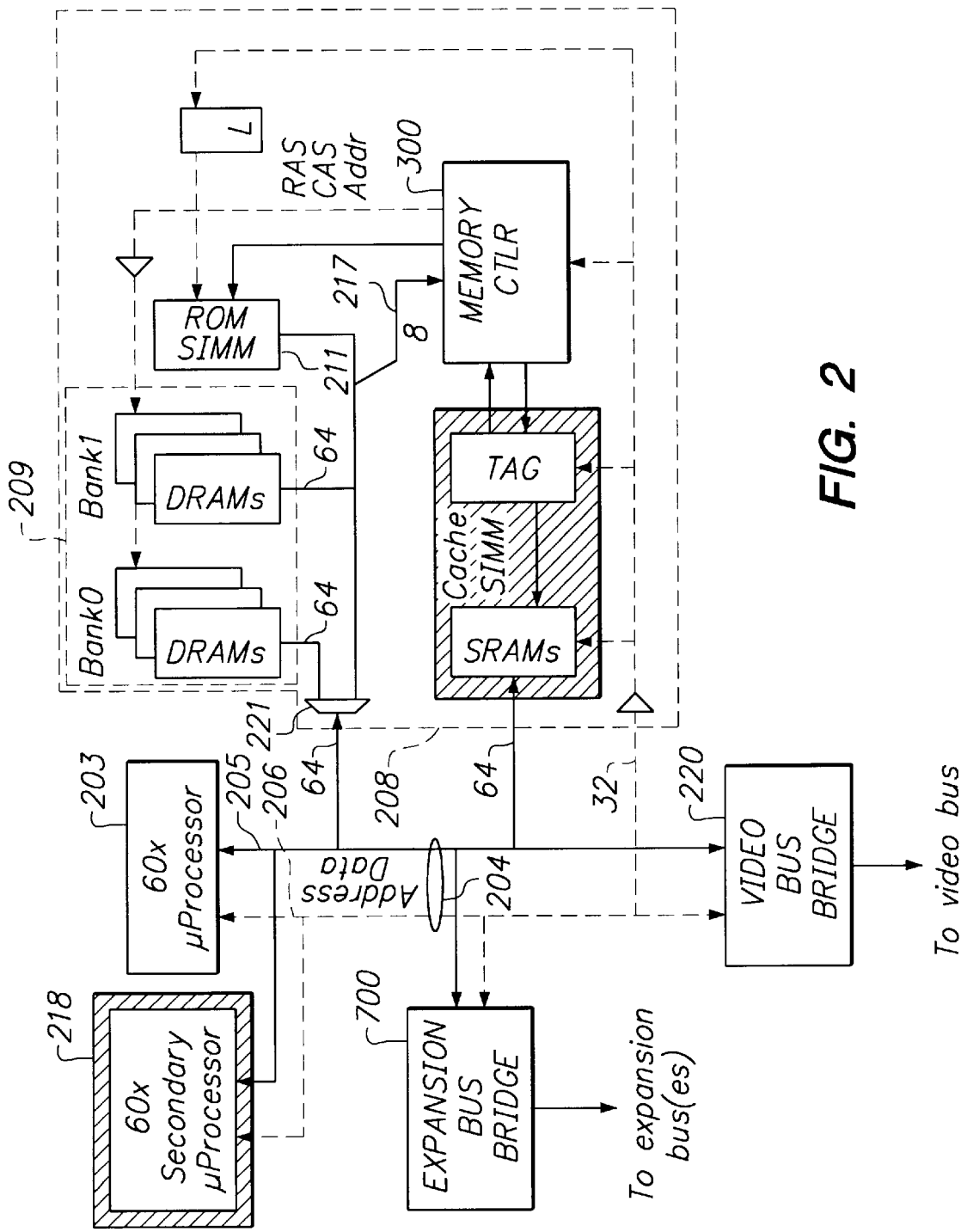
FIG. 2 is a system-level block diagram of a computer system in which the present invention may be used.

Referring now to FIG. 2, the present invention may be used in a computer system of the type shown. A CPU 203 (for example a Power PC 601 microprocessor) is connected to a system bus 204, including a data bus 205, an address bus 206, and a control bus (not shown). A memory subsystem 208 includes, in the illustrated embodiment, a main memory 209, a read-only memory 211, and a level-two cache memory 212. The CPU 203, through the system bus 204, is connected directly to the level-two cache memory 212. The CPU 203 is connected indirectly to the main memory 209 and the read-only memory 211, through a datapath circuit 221 and a memory controller 300. In general, the datapath circuit 221 provides for 64- or 128-bit reads from and writes to memory, in either big-endian or little-endian mode. The memory controller 300 controls the various memory devices within the memory subsystem 208 in response to signals on the system bus 204 and, in particular, provides address and control signals (i.e., RAS and CAS) to the main memory 209. The datapath circuit 221 and the memory controller 300 are connected by a register data bus 217.

Also shown is an optional secondary processor 218 which, like the CPU 203, may be a Power PC 601 microprocessor for example.

The system bus 204 is also connected to an expansion bus bridge 219 (possibly more than one) and, optionally, a video bus bridge 220. In a preferred embodiment, the system bus 204 is a superset of the conventional Power PC 601 microprocessor interface referred to herein as the Apple RISC Bus, or ARBus. An expansion bus connected to the expansion bus bridge 219 may be a standard PCI bus. Likewise, a video bus connected to the video bus bridge 220 may be a PCI-like bus.

Figure 3:
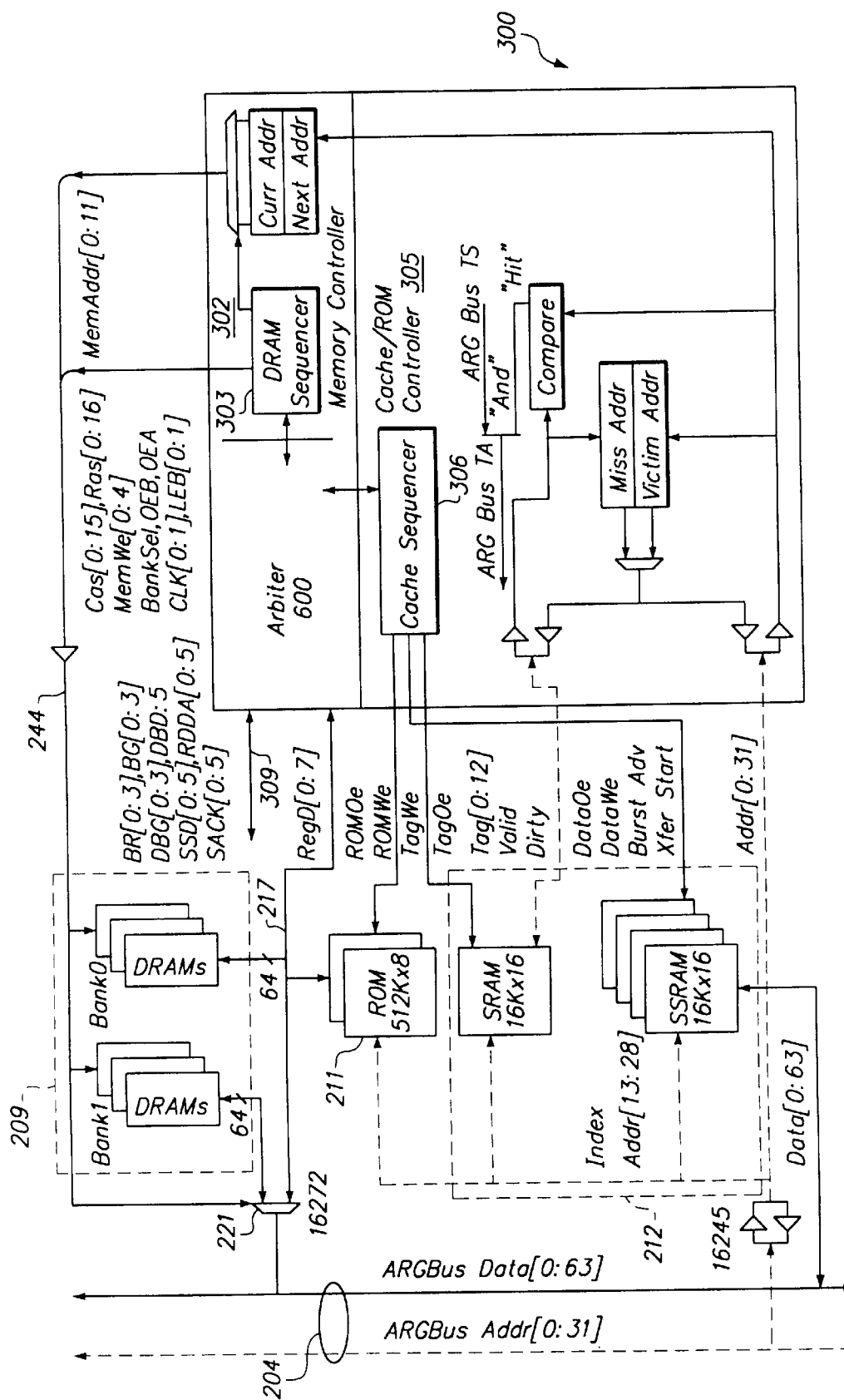
FIG. 3 is a block diagram of the memory controller 300 of FIG. 2.

Referring to FIG. 3, the memory subsystem 208 including the memory controller 300 of FIG. 2 are shown in greater detail, with particular emphasis on the various signals input to and output from the memory controller 300. The memory controller 300 includes a main memory controller 302, a cache/ROM controller 305, and an arbiter 600. The main memory controller 302 produces address and control signals for the main memory 209 and includes a DRAM sequencer 303 and certain memory address logic. The cache/ROM controller 305 produces control signals for the level-two cache memory 212 and the read-only memory 211 and includes a cache/ROM sequencer 306 and certain cache logic. Both the main memory controller 302 and the cache/ROM controller 305 exchange control signals with the arbiter 600, which executes overall control of the memory controller 300 and which is more particularly the subject of the following description.

The arbiter 600 includes a register file (not shown) that may be written and read by the CPU 203 across the register data bus 217. The register file includes, in addition to numerous base address registers, various ID, configuration and timing registers. The particulars of these registers are not essential to an understanding of the present invention and will not be further described. The arbiter 600 inputs various control signals from and outputs various control signals to a control bus 309. Some of the control signals carried by the control bus 309 are part of the conventional PowerPC 601 microprocessor interface. The majority of the signals carried by the control bus 309, however, are side-band information signals used in accordance with the present invention to independently control the address bus 206 and the data bus 205.

Prior to describing in detail the manner in which these side-band information signals are used to decouple the address bus 206 and the data bus 205, it will be useful to consider what is termed herein conventional usage of the PowerPC 601 microprocessor interface.

Figure 1:
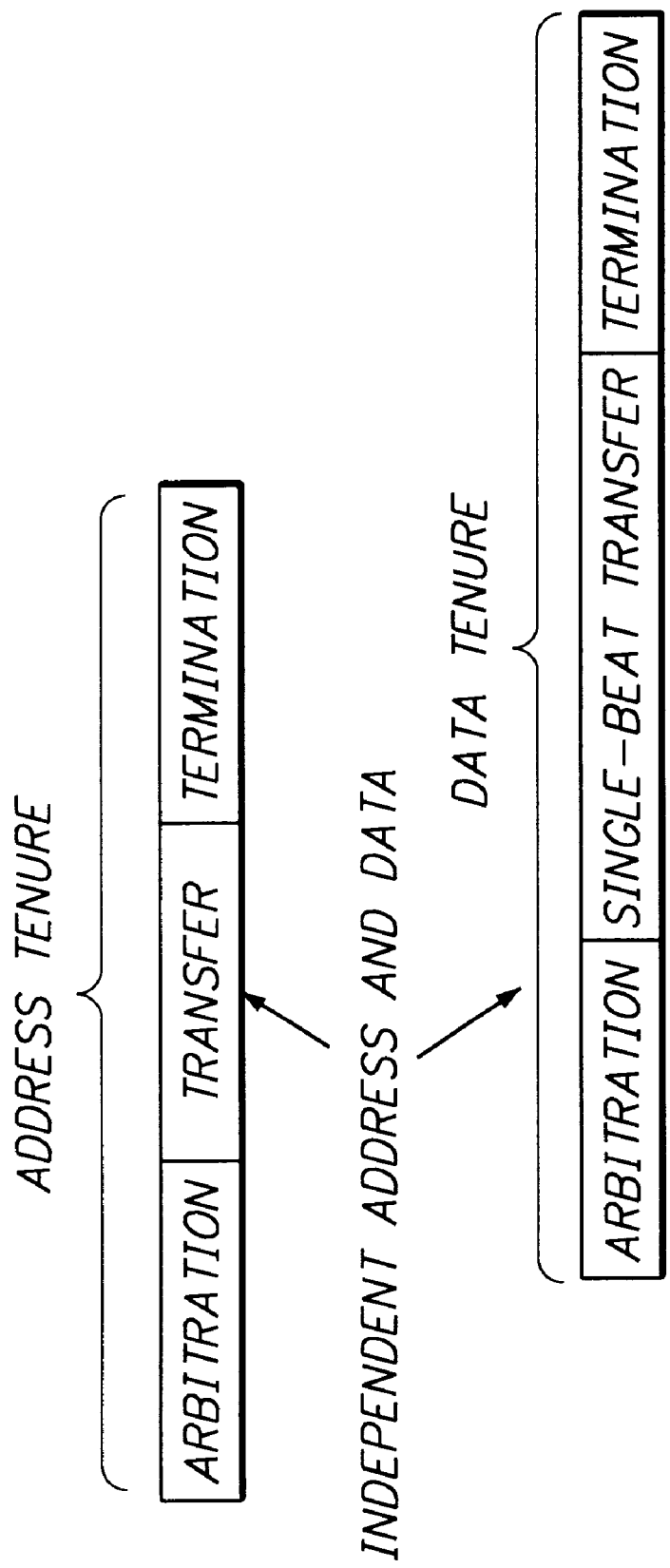
FIG. 1 is a diagram illustrating overlapping tenures for a single-beat transfer on a conventional MPC601 bus.
Figure 4:
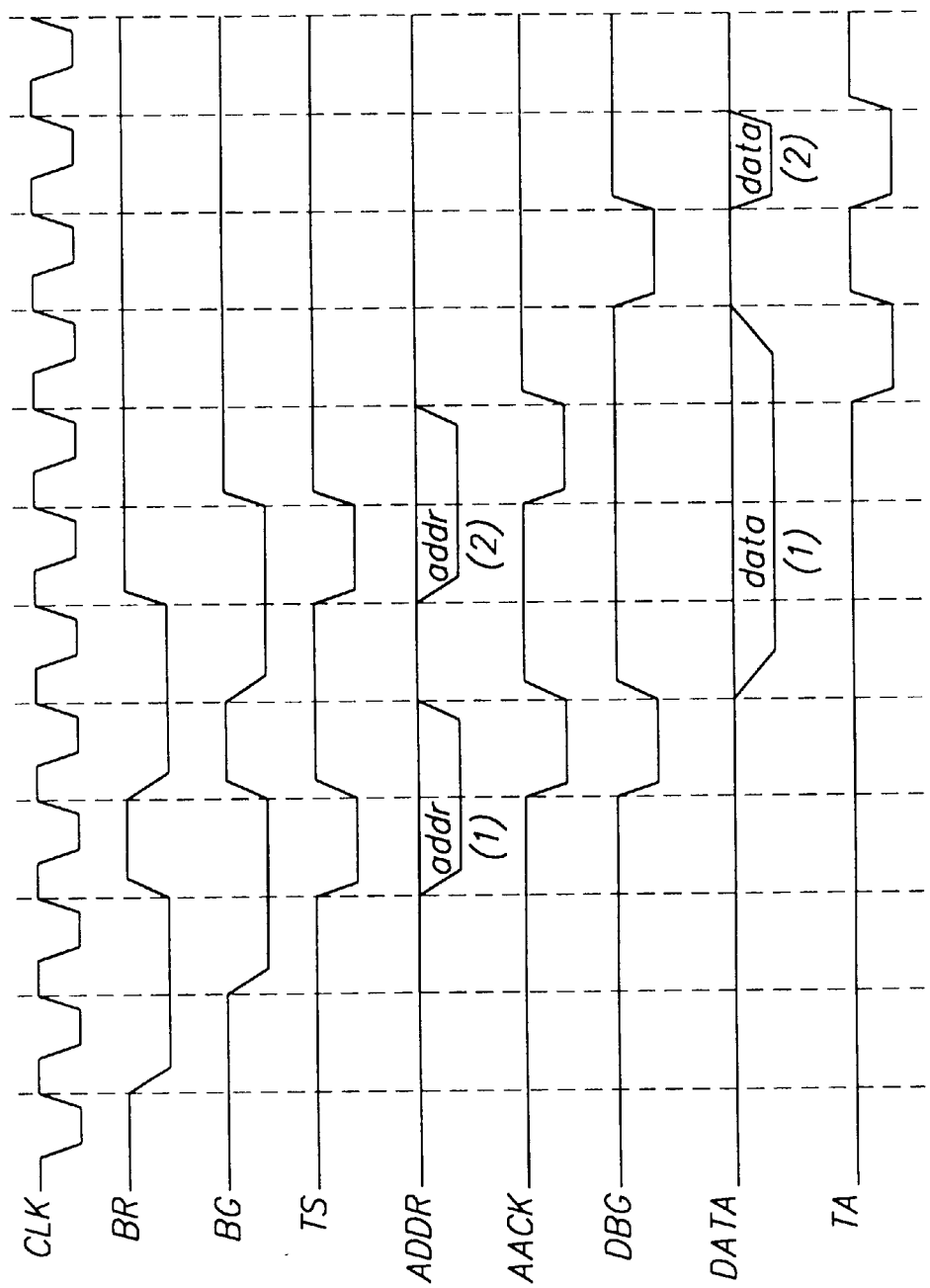
FIG. 4 is a timing diagram showing conventional usage of the MPC601 bus.

As shown in FIG. 1, address tenure and data tenure both have arbitration, transfer and termination phases. Each of these phases involves the exchange of respective handshaking signals. Referring to FIG. 4, the handshaking signals that characterize the address arbitration phase are a bus request signal BR and a bus grant signal BG. The bus request signal BR is an output signal of the CPU 203. The bus grant signal is an input signal of the CPU 203 and is output by the arbiter 600. Both the bus request signal BR and the bus grant signal BG relate to the address bus 206. When the CPU 203 has received the bus grant signal BG, it is free to enter the address transfer phase.

During the address transfer phase, a transfer start signal TS is asserted by the CPU 203 when the CPU 203 begins to drive the address bus 206. The address is decoded by a slave device as belonging to that address, i.e., falling within the device's assigned address space. During the address termination phase, the slave device asserts the address acknowledge signal AACK after it has sampled the address on the address bus 206.

During the address transfer phase, certain transfer attribute signals are used indicate the nature of transaction, including whether the transaction is an address-only transaction. Assuming that the transaction is not, then the transfer start signal TS is treated by the arbiter 600 as an implicit data bus request, starting the data arbitration phase. Following assertion of the acknowledge signal AACK, a data bus grant signal DBG is asserted by the arbiter 600 once the data bus 205 is available for use by the CPU 203. The CPU 203 may then begin the data transfer phase on the next cycle by driving the data bus 205. During a subsequent data termination phase, the slave device asserts a transfer acknowledge signal TA after it has sampled the data on the data bus 205.

The foregoing sequence of operations is repeated for a second subsequent transaction. In FIG. 4, the transaction to which address and data information pertain is indicated in parentheses, i.e., transaction (1) and transaction (2).

Note that in FIG. 4, address tenures and data tenures, although they may be pipelined, are tightly ordered. That is, data bus tenure on the system is granted in the same order as address tenure is granted even if the address tenures are granted to different masters. In precise terms, if TS(n) is for Master A and TS(n+1) is for Master B, then DBG(n) will be for Master A and DBG(n+1) will be for Master B.

This tight ordering of the conventional MPC601 bus may result in considerable system performance degradation, especially as bus speed increases. A read transaction to an expansion-bus device, for example, will typically be high-latency as compared to a main-memory read transaction. Tight ordering of address and data tenures results in such latency impacting the data bus. That is, even though another transaction might be ready to use the data bus first, during the latency period, it cannot because of the tight ordering of address and data tenures. If a system is to handle information streams having real-time constraints, such as video streams, it is important to ensure that the data bus is not unavailable for use during substantial periods of time; otherwise real-time deadlines may be missed, resulting in objectional artifacts during presentation.

The architecture of the computer system of FIG. 2 decouples address and data tenures such that data bus utilization is increased. This increase in data bus utilization allows for higher real-time performance to be achieved. In particular, the present invention allows for a true split-bus architecture with ordered slaves and ordered masters. "Ordered," in one usage, means each master and each slave has its own independent FIFO structure supporting "ordered" service to transactions posted to it. If a slave receives three transactions A, B, and C, the it will respond to A first, B second, and C third. If a master performs transactions D, E, and F, then it expects servicing of those transactions in the order of D first, E second, and F third. In one embodiment, there can be up to three outstanding master/slave pair transactions at one time.

Referring briefly again to FIG. 3, the side-band information signals carried by the control bus 309 are side-band information signals used to decouple the address bus 206 and the data bus 205. These side-band information signals include, in addition to the bus request signal BR, the bus grant signal BG and the data bus grant signal DBG of FIG. 4, corresponding signal for each master besides the CPU 203.

In one embodiment, the system includes, besides the CPU 203, four additional masters for up to a total of five masters: the CPU 203, the secondary processor 218 (if present), the expansion bus bridge 219, one additional expansion bus bridge (if present), and the video bus bridge 220 (if present). The control bus 309 therefore carries five bus request signals BR[0:4], five bus grant signals BG[0:4], and five data bus grant signals DBG[0:4].

In the same embodiment, the system includes six slaves: the expansion bus bridge 219 (also a master), the additional expansion bus bridge (also a master, if present), the video bus bridge 220 (also a master, if present), the main memory 209, the read-only memory 211, and memory controller registers accessible via the register data bus 217. For each slave, the control bus 309 carries three signals: a slave acknowledge signal SACK, a read data available signal RDDA, and a source- or sink-data signal SSD. The control bus 309 therefore carries six slave acknowledge signals SACK[0:5], six read data acknowledge signals RDDA[0:5], and six source- or sink-data signals SSD[0:5].

Figure 5:
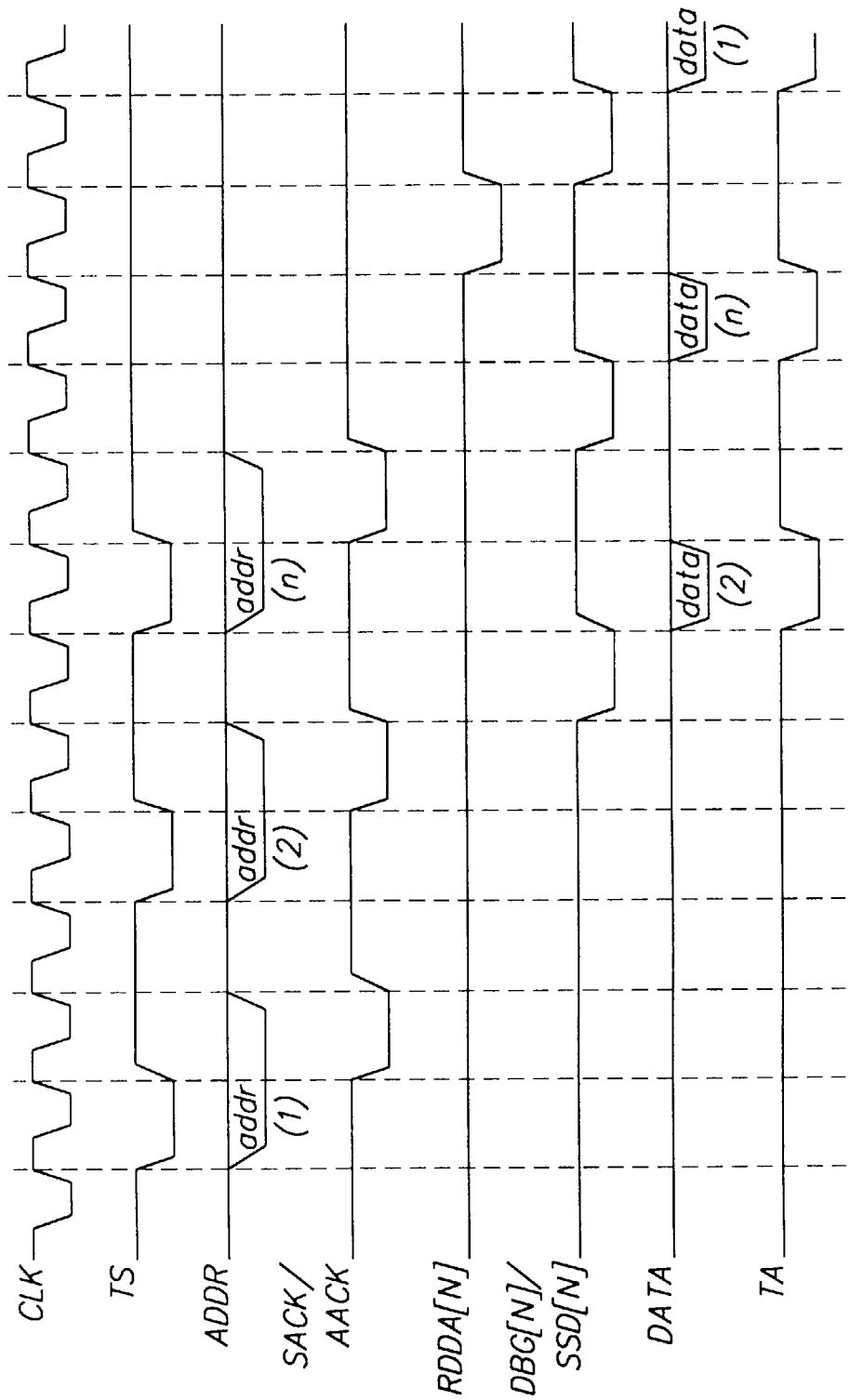
FIG. 5 is a timing diagram showing usage of the ARBus (a superset of the MPC601 bus) in the high-performance computer architecture of FIG. 2.

The manner in which the foregoing signals are used to decouple address tenures and data tenure may be appreciated with reference to FIG. 5. For simplicity, the address arbitration phase has not been illustrated. The address transfer phase is essentially the same as in the conventional case. The address termination phase, however, differs. The addressed slave asserts the AACK signal in the conventional manner, the AACK signal being used by the master. In parallel with AACK, the addressed slave generates a SACK signal for use by the arbiter 600. The arbiter uses this information about which slave has acknowledged in order to reorder transactions on the system bus 204.

In the data arbitration phase, the data bus is granted to masters based on a priority ordering of masters, and is granted to slaves based in part on the priority of the master of the transaction and in part on the availability of data from the slave. What may be considered in effect two sets of grant signals are therefore defined, DBG[0:#Masters−1] for masters and SSD[0:#Slaves−1] for slaves.

Assume, for example, that in FIG. 5 the first transaction is a read by the CPU 203 from the expansion bus bridge 219 and that the second and third transactions are writes to memory from the video bus bridge 220. In general, video transactions will be assigned a higher priority than transactions by the CPU 203 because of the real-time requirements of video transactions. Data bus grant signals are therefore issued to video bus bridge 220 for the first video transaction (2), which proceeds through the data transfer phase, and the second video transaction (n), which also proceeds through the data transfer phase. The CPU 203 will not be issued a data bus grant signal for its read from the expansion bus bridge 219 until a read data acknowledge signal has been returned to the arbiter 600 from the expansion bus bridge 219. Then, the CPU 203 will be issued a data bus grant signal for its read and the expansion bus bridge 219 will simultaneously be issued a corresponding slave source-data signal causing it to present its data on the data bus 205 to be sampled by the CPU 203.

As may be appreciated from the foregoing description, the data arbitration phase in accordance with the present invention is very different than in the conventional case. This different manner of operation allows address and data tenures to be decoupled, increasing utilization of the data bus. The data transfer and data termination phases, however, are essentially the same as in the conventional case.

Transaction reordering is controlled by the arbiter 600. The general characteristics of the arbiter 600 will first be described, after which the arbiter 600 will be described in greater detail.

The basic behavior that the arbiter 600 guarantees is as follows:

Any given ARBus master has its own address and data tenures strictly ordered. That is, DBG(n) always corresponds to TS(n) and for a set of TS(n) and TS(n+1), DBG(n) will always occur before DBG(n+1).

Any given ARBus slave has its own data tenures strictly ordered. That is, SSD(n) always corresponds to TS(n) and for a set of TS(n) and TS(n+1), SSD(n) will always occur before SSD(n+1).

Data bus tenure is not necessarily granted on the ARBus in the same order as address tenure is granted if the address tenures are granted to different masters. That is, if TS(n) is for Master A and TS(n+1) is for Master B, DBG(n) may be for Master B and therefore DBG(n+1) for Master A.

In the illustrated embodiment, the arbiter 600 supports five logical masters. The five masters arbitrate for use of the bus in accordance with a fixed priority as follows: the video bus bridge 220, the expansion bus bridge 219, an additional expansion bus bridge (if present), the CPU 203, and the secondary processor 218. By giving highest priority to the video bus bridge 220, the arbiter 600 allows the video bus bridge 220 to "hog" the ARBus.

The arbiter 600 may optionally "park" the CPU 203 or the video bus bridge 220 on the ARBus by asserting the appropriate BG wire during idle bus cycles. The default mode of operation is to park the most recent master.

Address bus arbitration occurs in every cycle that an address tenure is not active. Masters assert their individual bus request signals (BR) to the arbiter 600 to signal a request for service. The arbiter 600 signals the master which has won the arbitration by asserting bus grant (BG). Masters that have BG asserted in a given cycle are free to assert TS and therefore start a transaction in the next cycle.

The arbiter 600 controls the use of the data signals as a function of the address and the availability of read data. If a given ARBus address receives an AACK, the arbiter 600, by sampling the SACK signals, knows which slave will accept write data or will return read data. A slave that asserts AACK for a write transaction gives implicit permission to the arbiter 600 to grant the data bus to the master and allow it to assert the associated write data. Slaves must assert RDDA when requested return read data is available.

The arbiter 600 grants the data bus to a selected master via the assertion of DBG (Data Bus Grant) and indicates to the slave that data is to be asserted or accepted via the assertion of SSD (Source or Sink Data).

Transactions which do not involve a data transfer (Address-Only transactions) are typically generated by the CPU 203 or the secondary processor 218 and are simply acknowledged (AACK asserted) by the arbiter 600.

Figure 6:
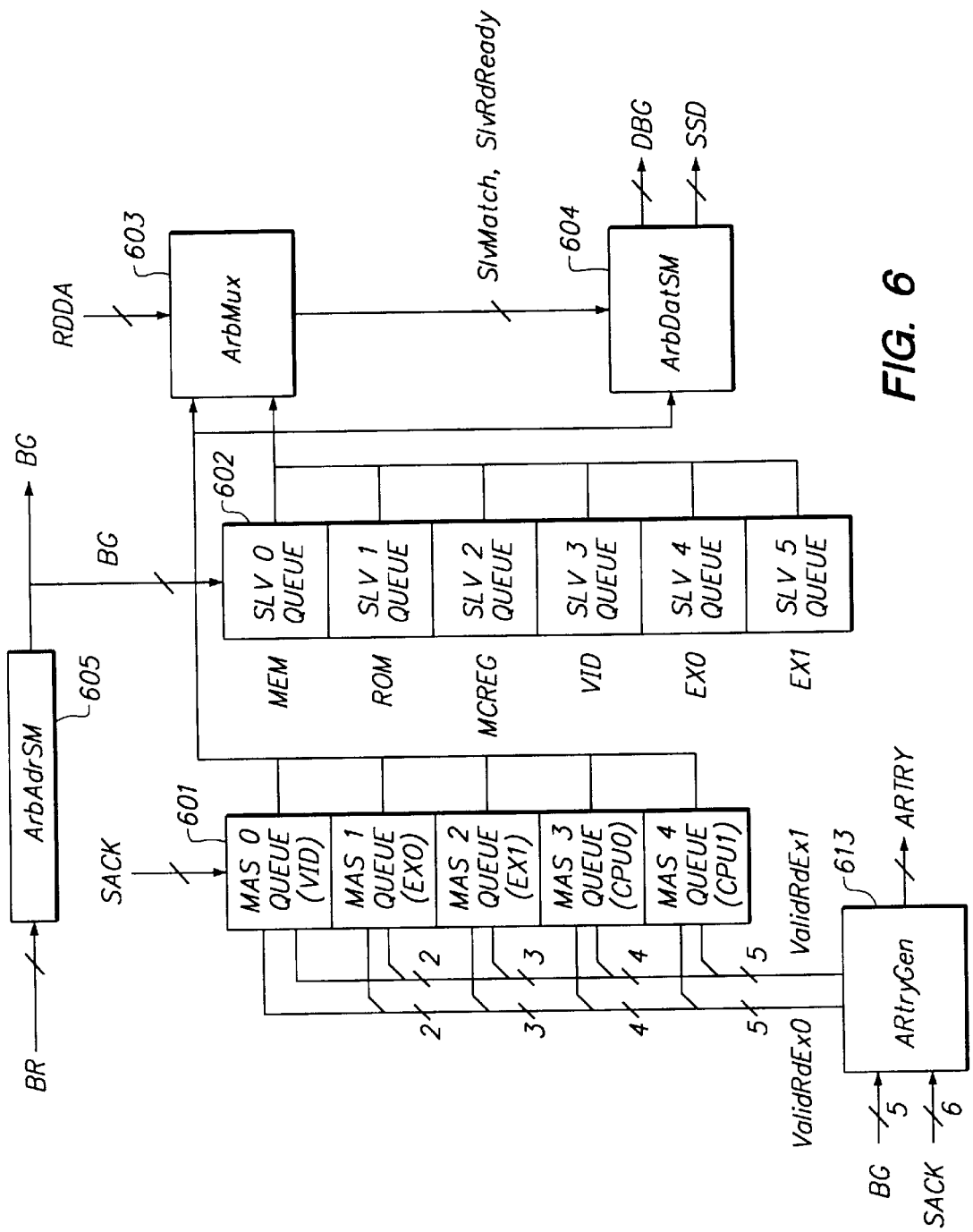
FIG. 6 Is a block diagram of the arbiter 600 of FIG. 3.

Referring now to FIG. 6, the arbiter 600 will be described in greater detail. The arbiter 600 includes master queues 601, one for each master in the system, and slave queues 602, one for each slave in the system. Each of the master queues 601 are connected at their respective data inputs to a SACK vector composed of the slave acknowledge signals SACK of each of the slaves, in addition to a Rd/Wr signal. Hereinafter, the term "SACK vector" will be understood to mean signals including the slave acknowledge signals SACK of each of the slaves and the Rd/Wr signal. Each of the slave queues 602 are connected at their respective data inputs to a BG vector composed of the bus grant signals BG of each of the masters. (In more precise terms, the BG vector is the physical bus grant signals sampled in the cycle that the TS signal is asserted.) The bus grant signals BG are produced by an address bus arbiter state machine 605 in response to the bus request signals BR of each of the masters.

Each time the address acknowledge signal AACK is presented on the system bus 204, the master queues 601 and the slave queues 602 are updated by pushing the SACK vector onto one (and only one) of the master queues 601 and pushing the BG vector onto one (and only one) of the slave queues 602. In particular, the SACK vector is pushed onto one of the master queues 601 identified by the BG vector, and the BG vector is pushed onto one of the slave queues 602 identified by the SACK vector.

The SACK vectors at the heads of the master queues 601 and the BG vectors at the heads of the slave queues 602 are input to an arbiter multiplexer 603. The arbiter multiplexer 603 looks at the SACK vectors at the head of the master queues 601 and determines which of the slave queues 602 designated by the SACK vectors have at their heads a BG vector that designates the reciprocal one of the master queues 601. On the next data tenure of the masters for which this condition is satisfied, data will be sourced from the corresponding slave. The arbiter multiplexer 603 also receives a read-ready vector RDDA composed of the read data acknowledge signals RDDA of each of the slaves.

Based on the foregoing input signals, the arbiter multiplexer 603 produces a slave match vector SlvMatch and a slave read ready vector SlvRdReady. The slave match vector SlvMatch designates those masters finding matching slaves, i.e., slaves expecting to next respond to transactions from those respective masters. The slave read ready vector SlvRdReady identifies, of those masters, which have slaves that are actually ready to source data. The slave match vector SlvMatch and the slave read ready vector SlvRdReady are input to an data bus arbiter state machine 604.

The SACK vectors at the head of the master queues 601 are also input to the data bus arbiter state machine 604. The data bus arbiter state machine 604 determines which transaction is ready to go by examining the bits of the SlvMatch vector in priority order and, it a bit indicates a matching master/slave pair, determining further whether either the transaction is a write transaction (by examining the Rd/Wr bits at the front master queue entries) or the corresponding bit in the SlvRdReady vector is set, indicating that the slave is ready to source data. In Verilog notation, the data bus arbiter state machine 604 computes a vector TransReady as follows:

TransReady[0:4]=SlvMatch[0:4]& ({5{Write}}||SlvRdReady[0:4]) Based on the computed TransReady vector, the data bus arbiter state machine 604 asserts a corresponding one of the data bus grant signal DBG. The data bus arbiter state machine 604 also asserts a corresponding one of the source-or-sink-data signals SSD, in accordance with the SACK vector at the front of the winning master queue.

Operation of the arbiter 600 may be further understood from the following illustrative examples.

To take a relatively simple example, assume that Master 1 (the expansion bus bridge 219) issues a read transaction to Slave 3 (the video bus bridge 220). Slave 3, when it is ready to service the transaction, asserts the AACK signal on the ARBus and, at the same time, generates a SACK signal to the arbiter 600 identifying Slave 3. When the arbiter 600 receives the AACK signal, the SACK vector is pushed onto one of the master queues 601 based on the BG vector. At the same time, the SACK vector is pushed onto one of the master queues 601 based on the BG vector. Assuming that no other transactions are presently queued, a SACK vector value representing Slave 3 (for example b111011) will appear at the head of the one of the master queues 601 for Master 1, and a BG vector value representing Master 1 (for example b10111) will appear at the head of the one of the slave queues 602 for Slave 3. The arbiter multiplexer 603 will therefore cause the SlvMatch vector to have a value indicating a match for Master 1 (for example b01000). When Slave 3 is ready with read data, it will assert its RDDA signal, in response to which the arbiter multiplexer 603 will cause the SlvRdReady vector to have a value indicating the readiness of Slave 3 (for example b00100). If no other transactions having higher priority have in the meantime become ready to go, the data bus arbiter state machine 604 will then issue a data bus grant signal DBG to Master 1 and a sink/source data signal SSD to Slave 3, and the data transfer phase of the transaction will proceed.

To take another, more complex example, assume that after Master 1 has issued the foregoing transaction request (shown below as Transaction 1) but before Slave 3 has responded with an RDDA signal, a series of further transactions is issued, in accordance with the following chronological sequence:

1. Master 1 Rd Slave 3
2. Master 3 Wr Slave 3

3. Master 3 Wr Slave 0
4. Master 4 Rd Slave 1
5. Master 2 Wr Slave 4

Note that transactions 1 and 2 both involve Slave 3, and transactions 2 and 3 both involve Master 3. Because masters and slaves are ordered, data dependencies are created. That is, transaction 2 cannot complete until transaction 1 has completed. Similarly, transaction 3 cannot complete until transaction 2 has completed. Transactions 4 and 5, on the other hand, have no data dependencies. Transaction 4 is a read from Master 4 (CPU 1) to Slave 1 (ROM). In the case of ROM and RAM, because read latency is minimal and is know in advance, the RDDA signals for ROM and RAM are tied asserted.

Transaction 2, Master 3's write of Slave 3, is queued up behind Master 1's read of Slave 3. Transaction 3, Master 3's write of Slave 0, is queued up behind Master 3's write of Slave 3. When transaction 4 is queued, there are matching queue entries at the head of the master and slave queues for transactions 1 and 4. Transaction 1, however, is a read transaction and is not allowed to proceed until an RDDA is received from Slave 3.

Therefore, the arbiter 600 first grants the data bus to Master 4 and Slave 1 for transaction 4. When transaction 5 is queued, there are matching queue entries at the head of the master and slave queues for transactions 1 and 5. Assume, however, that an RDDA has still not been received from Slave 3. The arbiter 600 will then grant the data bus to Master 2 and Slave 4 for transaction 5.

Assume now that an RDDA is received from Slave 3. Transactions 1, 2 and 3 will then, in that order, be granted the bus and will complete. In the foregoing example, whereas the address order of the transactions is 1, 2, 3, 4, 5, the data order is 4, 5, 1, 2, 3.

When the system is totally idle, i.e., the data bus is not busy and all queues are empty, a CPU memory read transaction is executed immediately without queuing the transaction.

The expansion bridge responds to transactions on the ARBus and PCI Bus and forwards them to the "other" bus appropriately. The primary function of the expansion bridge is to map transactions from one bus to the other. The job of the expansion bridge to transfer data between the ARBus and the PCI Bus is complicated by the fact that the ARBus and the PCI Bus are very different in a number of respects as shown in the following table:

TABLE 1

| BUS CHARACTERISTIC | BUS | |
| --- | --- | --- |
| | ARBUS | PCI BUS |
| ADDRESS/DATA TENURES | Full split transaction (pended) | Single envelope (non-pended) |
| ENDIANESS | Big endian | Little endian |
| CYCLE TYPES | One cycle type | Many cycle types |
| TRANSACTION LENGTHS | Fixed (3.2-byte) burst length | Arbitrary length transactions with byte-enabled writes. |
| BUS SPEED | Up to 50 MHz | 33 MHz |

The PowerPC architecture and the ARBus do not "naturally" generate many types of cycles that are required by the PCI specification. These unique PCI Bus cycles are included in the PCI specification to provide backwards compatibility for x86/ISA/IBM PC-AT cards and software. The expansion bridge provides facilities for generating PCI Bus configuration cycles, I/O cycles and PCI "Special Cycles"/"Interrupt Acknowledge" via special address spaces.

Figure 7B:
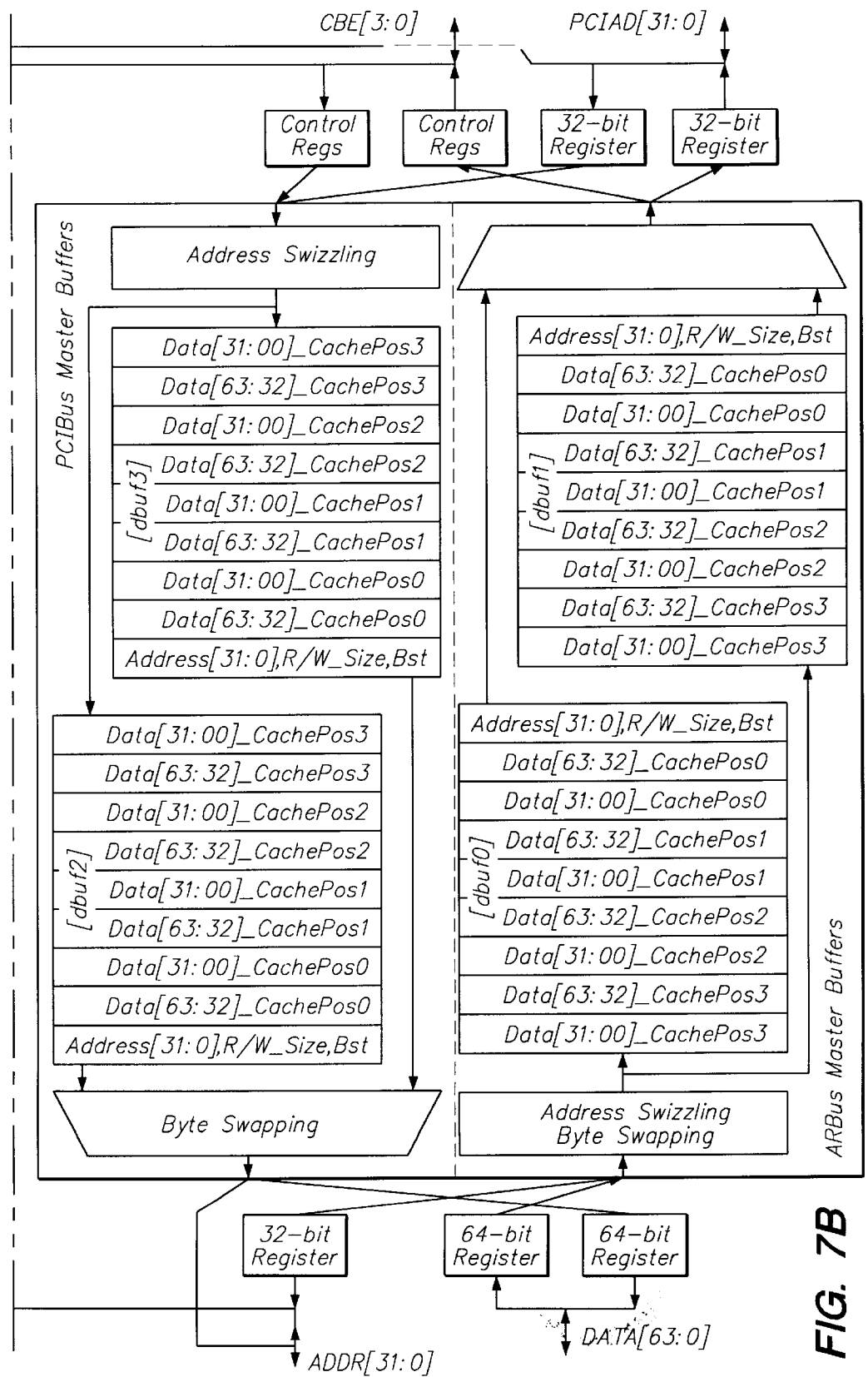
FIG. 7 is a block diagram of the expansion bridge 700 of FIG. 2.

Referring now to FIG. 7, the expansion bridge 700 will be described in greater detail. The expansion bridge is constructed with two main state machines for the ARBus and PCI Bus. The two main state machines actually consist of a number of smaller sub-state machines. These state machines operate in different clock domains and require that handshake signals be synchronized. Transactions passed between the ARBus and the PCI Bus are staged in a large packet-buffer structure. Data endian conversion is performed on the ARBus side of the packet buffer with data being stored in the packet buffer in PCI Bus Little Endian format. Address endian swizzling is performed on the master side of a transaction. For a master cycle to the PCI Bus from the ARBus, the address swizzling occurs on the ARBus side. For a master cycle to the ARBus from the PCI Bus, the address swizzling occurs on the PCI Bus side.

As explained previously, systems are most prone to deadlocks and livelocks when there is an expansion bridge in the system. In the description that follows, a deadlock will be introduced, together with its LockUp type (A, B, or C as described below), a solution for the deadlock, and where in the system the deadlock prevention logic preferably resides. Deadlock prevention rules assume a starting point behavior in which the expansion bridge allows concurrent reads through the bridge, and the ARBus arbiter performs the DBWO* protocol as necessary. The DBWO* protocol allows the Processor to re-order a write data phase around a read data phase for snoop pushes.

An entire class of deadlocks and livelocks is related to the PCI Bus being stalled during reads. During a read, the PCI Bus can potentially remain stalled for micro-seconds at a time when the target of the read is on the other side of a bridge. For instance, a Master on PCI Bus 1 wants to read from a target behind a PCI2PCI bridge on PCI Bus 2. In this case the master incurs the latency of three bridges (a first expansion bus bridge, a second expansion bus bridge, and a PCI2PCI bridge) before actually reaching the target, and no other transactions can occur on PCI Bus 1 as long as the read is stalling the bus. If other transactions from the ARBus were able to get access to the PCI Bus and complete, then the class of deadlocks related to conflicting completion orders would disappear. This type of lockup is referred to herein as Type-A LockUp.

Another class of deadlocks and livelocks is related to the ISA bus and PCI2PCI bridge behavior. When an ARBus read occurs to an ISA bus or a target behind a PCI2PCI bridge, it has no way of knowing whether it will complete or be blocked. A "block" can occur for the ISA bus if there is an ISA bus master already on the ISA bus with a pending transaction; this transaction may or may not require ARBus access. A "block" can also occur for the PCI2PCI bridge if the bridge has writes posted to it that it must perform on the host side of the PCI2PCI bridge before completing the read. In either of these two cases, there is an ARBus master that will wait forever for its read to either the ISA bus or PCI2PCI bridge to complete. If anything "blocks" the ISA bus or PCI2PCI bridge from completing its non-back-offable access, deadlock will occur. This type of lockup is referred to herein as Type-B LockUp.

A third class of deadlocks and livelocks is related to the ARBus arbiter being fixed priority, and to cross-communication problems between devices on the bus who are both masters and slaves. Lower priority masters can be starved from gaining ownership of the ARBus when following the generic ARBus rules set forth for behavior following an ARBus ARTRY*. If in addition, the lower priority master is unable to accept transactions as a slave, deadlocks or livelocks can occur. This type of lockup is referred to herein as Type-C LockUp.

Deadlock avoidance is complicated by the fact that in some systems there may be more than one expansion bridge. Hence, deadlocks in a true split bus architecture having only a single expansion bridge connected to the ARBus will be considered first, followed by a consideration of deadlocks in a true split bus architecture having two expansion bridges. Systems having more than two expansion bridges will not be considered, although similar deadlock avoidance principles may be applied to such systems.

Various deadlocks can occur with a single expansion bridge in a system implemented with a split bus (ARBus), ordered masters, ordered slaves, and utilizing a fixed priority arbitration scheme for the masters on the ARBus. These deadlocks can also occur in a dual expansion bridge system with the same characteristics, but only one expansion bridge need be involved to cause the deadlock.

Figure 8:
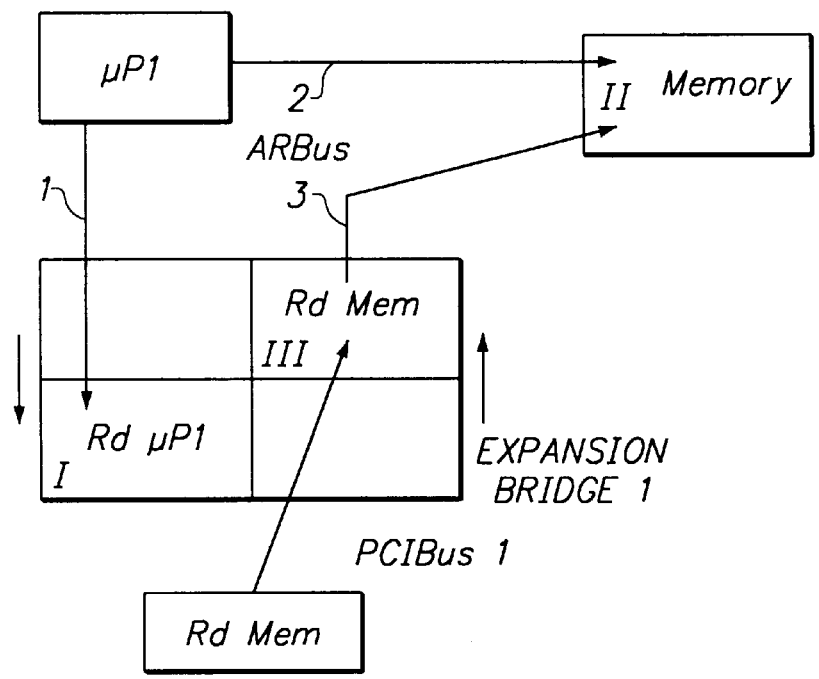
FIG. 8 illustrates a deadlock in which an ARBus master read of an expansion bridge is followed by an ARBus master read of memory.

Referring to FIG. 8, deadlock may occur when an ARBus master read of an expansion bridge is followed by an ARBus master read to memory. A typical sequence of transactions is as follows:

1. PCI Bus 1 Master initiates read of main memory, and stalls PCI Bus 1.
2. Processor 1 reads target behind Expansion Bridge 1 (Expansion Bridge 1 AAck*s without ARTRY*).
3. Processor 1 reads main memory (Memory Controller AAck*s without ARTRY*).
4. Expansion Bridge 1 forwards read of main memory (Memory Controller AAck*s without ARTRY*).

Master Processor 1 has ordered itself: a) Expansion Bridge 1, b) Read main memory. Slave main memory has ordered itself: a) Read by Processor 1, b) Read by Expansion Bridge 1. PCI Bus 1 has an implied ordering of a) Read main memory, b) Read by Expansion Bridge. PCI Bus 1 is stalled by the read of main memory and will not get off the bus until the read has completed. In this case, the completion order of Master Processor 1 directly conflicts with completion order of PCI Bus 1. This is a Type-A LockUp. There are two potential solutions: 1) Retry the Expansion Bridge 1 read of main memory, OR 2) Retry the Processor 1 read of main memory. For reasons described hereinafter, Solution 2 is preferred for ease of implementation. This deadlock is therefore avoided by having the ARBus arbiter prevent the Processor from reading main memory (via ARTRY*) following the Processor's read of an expansion bridge.

Figure 9:
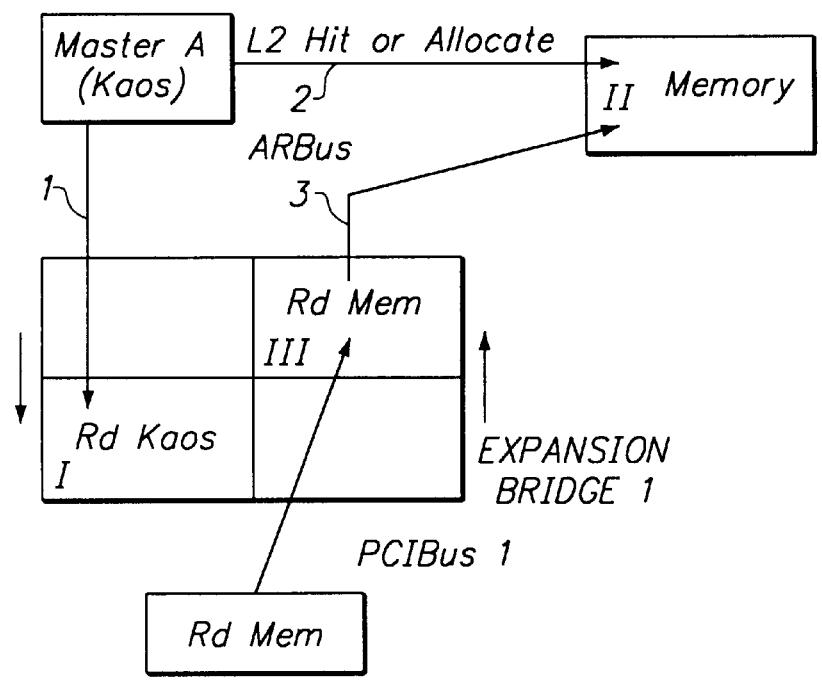
FIG. 9 illustrates a deadlock in which an ARBus master read of an expansion bridge is followed by an ARBus master L2 hit or allocate operation.

Referring to FIG. 9, deadlock may occur when an ARBus master read of an expansion bridge is followed by an ARBus master L2 hit or allocate operation. A typical sequence of transactions is as follows:

1. PCI Bus 1 Master initiates read of main memory, and stalls PCI Bus 1.
2. Master A reads target behind Expansion Bridge 1 (Expansion Bridge 1 AAck*s without ARTRY*).
3. Master A issues memory read causing the L2 (second level cache) to allocate the cache line.
4. Expansion Bridge 1 must complete its read of main memory, but it cannot complete.

Because the TAG SRAMs utilize a latch to capture the address from the main Address Bus during a TS_, no future TS_ can occur until the completion of the TAG update. The system arbiter prevents future TS_ events by deasserting all Bus Grants to Masters until the completion of the TAG update. Unfortunately, in the scenario described above, the TAG update will not complete until the PCI Bus Master A read of main memory has occurred. Master A has ordered itself: a) Read of Expansion Bridge 1, b) Read of main memory. Expansion Bridge 1 has ordered itself: a) Read of main memory, b) Read by Master A. This is a Type-A LockUp. Since the TAG update must complete without future occurrences of TS_, the deadlock fix is to have the ARBus arbiter prevent an access by Master A that would cause a second level cache hit or allocate (via ARTRY*) following Master A's read of an expansion bridge.

Figure 10:
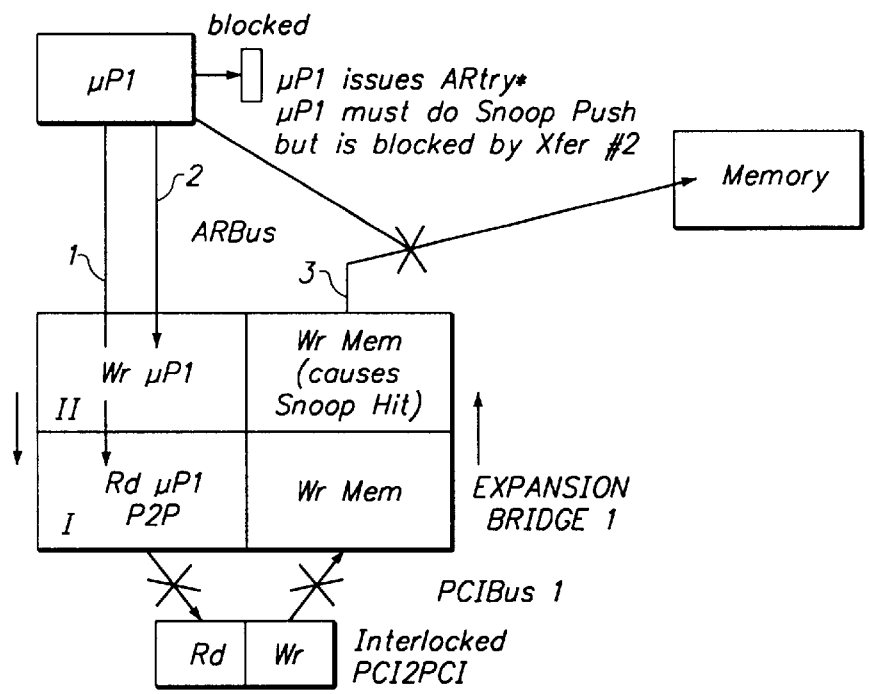
FIG. 10 illustrates a deadlock in which a processor read of an expansion bridge is followed by a processor write to that expansion bridge.

Referring to FIG. 10, deadlock may occur when a processor read of an expansion bridge is followed by a processor write to that expansion bridge. A typical sequence of transactions is as follows:

1. Processor 1 reads target behind PCI2PCI bridge behind Expansion Bridge 1. PCI2PCI bridge blocks read completion in order to flush posted write data to target upstream of PCI2PCI bridge.
2. Processor 1 writes target behind Expansion Bridge 1.
3. Expansion Bridge 1 write attempt to main memory causes Processor 1 to attempt Snoop Push.

The PCI2PCI bridge has become interlocked, and must flush a posted write upstream of itself; in this case the write is headed toward the ARBus, and Expansion Bridge 1's buffers are full and cannot currently accept the write. The first two outstanding transactions in this scenario are 1) Master Processor 1 has an outstanding read of Expansion Bridge 1, followed by 2) Master Processor 1 has an outstanding write to Expansion Bridge 1. The third attempted transaction is a write cycle from Expansion Bridge 1 to main memory. However, this write cycle is to copyback-cacheable space and causes a snoop hit in Processor 1's cache. Processor 1 retries Expansion Bridge 1's write cycle, but now needs to push the dirty cache line to main memory. However, at this point it is unable to push the dirty cache line due to its outstanding write to Expansion Bridge 1. With the use of DBWO*, Processor 1 could have re-ordered the snoop push write transaction around its outstanding read of Expansion Bridge 1 (transaction number 1). However, the MPC60x microprocessor is not capable of re-ordering the snoop push write transaction around its own outstanding write. This is a Type-B LockUp, caused by Processor 1's inability to complete its read due to the PCI2PCI bridge's interlocking behavior. This deadlock is avoided by having the ARBus arbiter prevent the Processor from writing to an expansion bridge if it has an outstanding read of the expansion bridge. This will allow the Processor to perform the Snoop Push write transaction if required.

There is a set of deadlocks that only occur with more than one an expansion bridge in a system implemented with a split bus (ARBus), ordered masters, ordered slaves, and utilizing a fixed priority arbitration scheme for the masters on the ARBus. In one particular system architecture, high to low priority is: 1) Video, 2) Expansion Bridge 1, 3) Expansion Bridge 2, 4) Processor 1, 5) Processor 2. Deadlock rules described previously also apply to a multiple expansion bridge environment. The following new rules are in addition to the previous rules.

Figure 11:
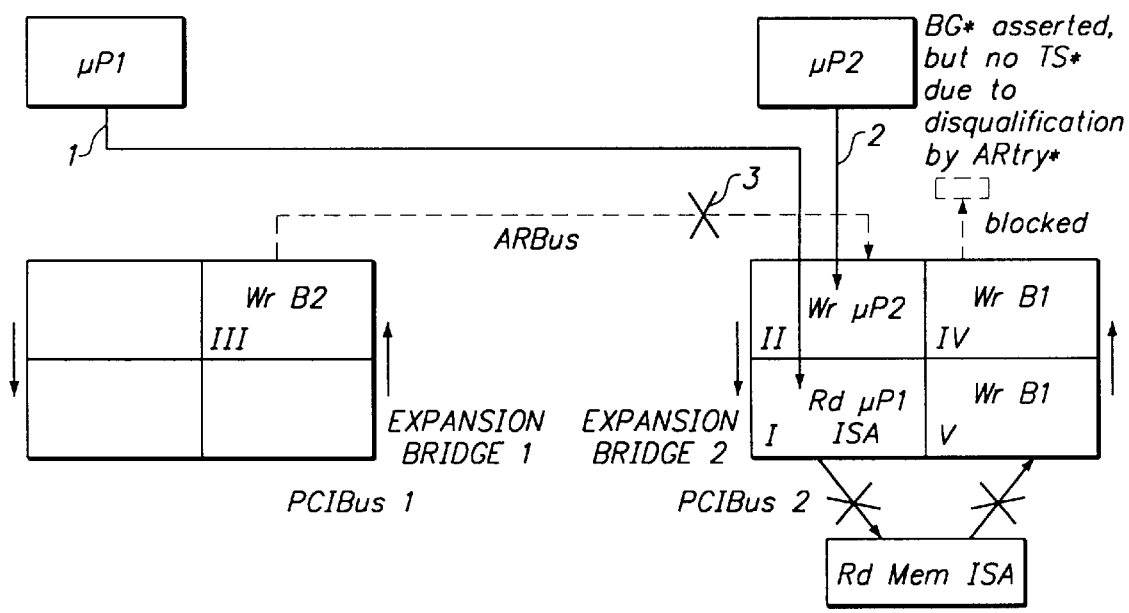
FIG. 11 illustrates a deadlock in which a Bus Grant signal and an Address Retry signal occur concurrently.

Referring to FIG. 11, deadlock may occur in the case of concurrent Bus Grant and Address Retry signals. A typical sequence of transactions is as follows:

1. Expansion Bridge 1 attempts a write to Expansion Bridge 2 but Expansion Bridge 2 buffers are full.
2. Expansion Bridge 2 has a write to Expansion Bridge 1 and received Bus Grant during Expansion Bridge 1 cycle.
3. Expansion Bridge 2 ARTRY*s Expansion Bridge 1 due to full buffers. As per ARBus specification, Expansion Bridge 2 ignores its Bus Grant and does not take the ARBus.

4. As per ARBus specification, following ARTRY* both Expansion Bridge 1 and Expansion Bridge 2 deassert their Bus Requests for one clock. Both re-assert Bus Requests. Expansion Bridge 1 wins. The foregoing sequence of transactions is repeated indefinitely.

Following ARBus protocol after an ARtry*, a master who has a Bus Grant ignores it. All masters must deassert their Bus Requests the clock following an ARtry*, and then re-assert them. In a fixed priority arbitration scheme, the higher priority master will win every time, and if it cannot complete its access, an ARBus livelock results. This is a Type-C LockUp, and is avoided by having the expansion bridge disregard the ARBus protocol, and take the address tenure if a Bus Grant occurs during an ARtry*. An expansion bridge can do this without adverse side-effects because it is not a snooping bus master.

Figure 12:
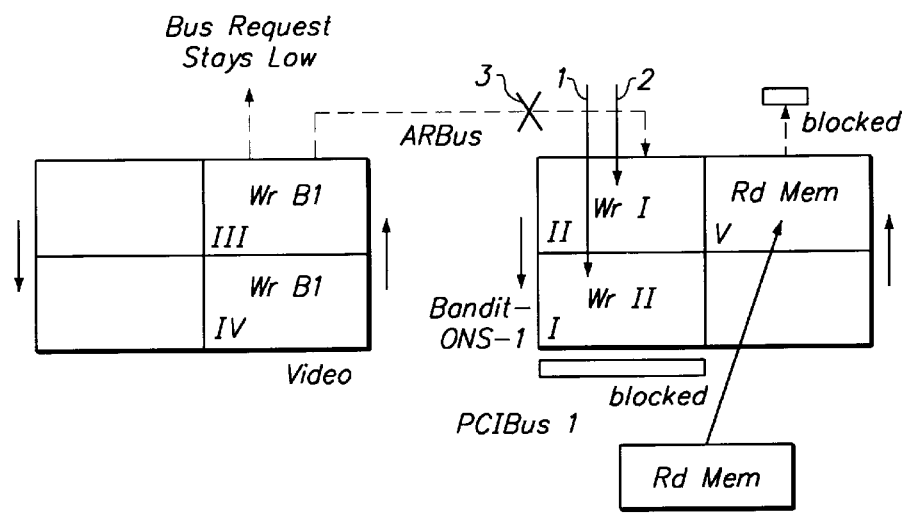
FIG. 12 illustrates a deadlock in which a Bus Request signal and an Address Retry signal occur concurrently.

Referring to FIG. 12, deadlock may occur in the case of concurrent Bus Request and Address Retry signals. A typical sequence of transactions is as follows:

1. Video attempts a write to Expansion Bridge 1 but Expansion Bridge 1 buffers are full;
2. Expansion Bridge 1 has its Bus Request asserted because it has a read of memory to perform, but Video, with multiple cycles to perform, keeps its Bus Request asserted.
3. Expansion Bridge 1 ARTRY*s Video due to full buffers. As per ARBus specification, Expansion Bridge 1 and Video deassert their bus requests the clock following ARTRY*.
4. Video and Expansion Bridge 1 reassert the bus requests. Since Video has a fixed higher priority than Expansion Bridge 1, it constantly gets Bus Grant. The foregoing sequence of transactions is repeated indefinitely.

Following ARBus protocol after an ARTRY*, all masters on the bus deassert their Bus Requests to give the Processor a guaranteed window being the only bus requestor. This guarantees that the Processor, who normally has lowest ARBus priority, acquires the bus next in order to complete a high priority transaction such as a Snoop Push. In this case, the ARBus protocol causes the lower priority expansion bridge to never receive a Bus Grant due to the higher priority Video requesting the ARBus to complete its access. Since the completion of the Video access is dependent on the expansion bridge freeing up some buffer space, and since the expansion bridge must get the ARBus to complete its access or receive an ARTRY* in order to free up PCI Bus 1 to free up buffer space for the Video write to come in, the expansion bridge effectively needs higher priority than Video this time. This is a Type-C LockUp, and is avoided by having an expansion bridge keep its Bus Request asserted the clock following an ARTRY* if it is the source of the ARTRY*. This is precisely the protocol the MP60X processor performs to effectively achieve a higher priority when necessary.

Figure 13:
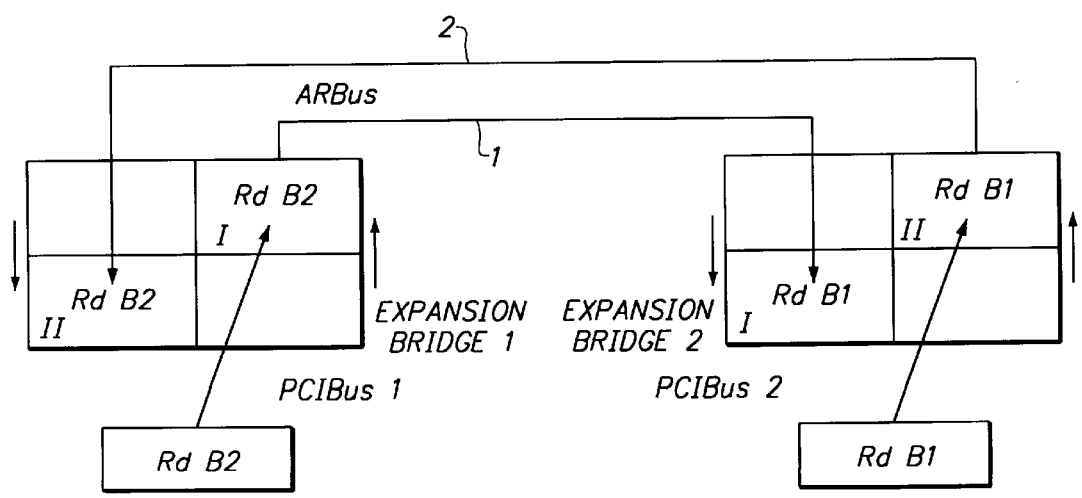
FIG. 13 illustrates a deadlock in which expansion bridges read each other concurrently.

Referring to FIG. 13, deadlock may occur in the case of expansion bridges reading each other concurrently. A typical sequence of transactions is as follows:

1. A Master Behind Expansion Bridge 1 reads a target behind Expansion Bridge 2 (Expansion Bridge 2 AAck*s) stalling PCI Bus 1. The read remains outstanding within Expansion Bridge 2.
2. A Master Behind Expansion Bridge 2 reads a target behind Expansion Bridge 1 (Expansion Bridge 1 AAck*s) stalling PCI Bus 2. The read remains outstanding within Expansion Bridge 1.

This is the most basic deadlock case. Each expansion bridge has a stalled bus, and yet each expansion bridge accepts the read from the opposite expansion bridge. Neither of the accepted reads can complete because the buses they are attempting to get onto are stalled. At least one of the buses must free itself for this basic deadlock to be avoided; one expansion bridge must not accept the read, but must ARTRY* the read attempt to it. This is a Type-A LockUp, and is avoided by having an expansion bridge disallow a read of its slave while it has an outstanding master read tenure (AAck* without ARTRY*). Once the data bus grant is received corresponding to the address tenure, then the transaction is guaranteed to complete and slave reads can be accepted.

Figure 14:
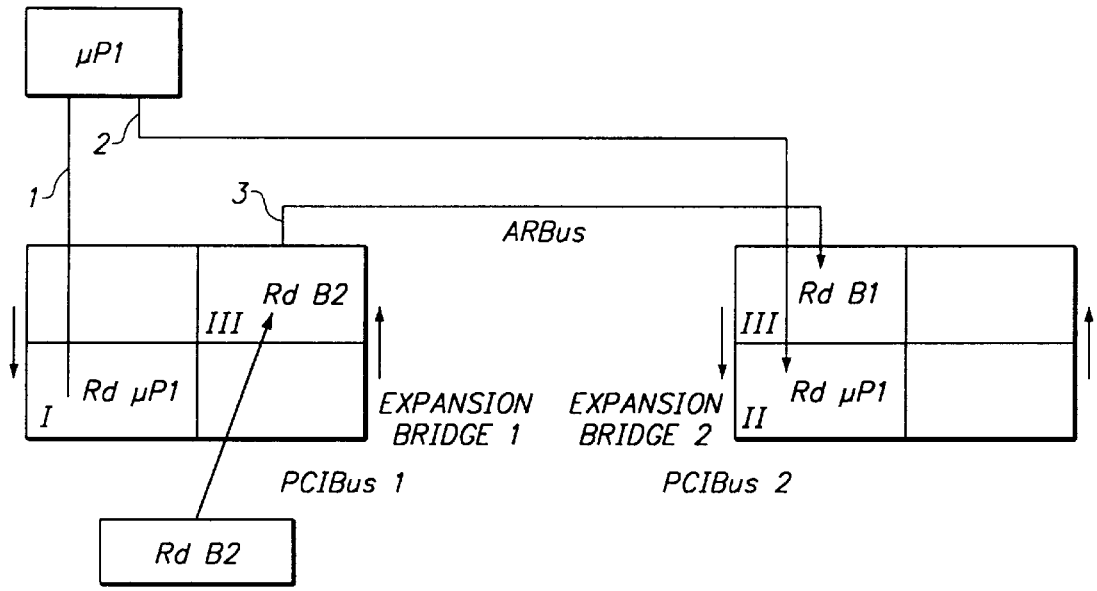
FIG. 14 illustrates a deadlock in which one master attempts to read both expansion bridges.

Referring to FIG. 14, deadlock may occur in the case of one master attempting to read both expansion bridges. A typical sequence of transactions is as follows:

1. PCI Bus 1 Master initiates read of target behind Expansion Bridge 2, and stalls PCI Bus 1.
2. Processor 1 reads target behind Expansion Bridge 1 (Expansion Bridge 1 AAck*s without ARTRY*).
3. Processor 1 reads target behind Expansion Bridge 2 (Expansion Bridge 2 AAck*s without ARTRY*).
4. PCI Bus 1 Master's read of target behind Expansion Bridge 2 occurs on ARBus (Expansion Bridge 2 AAck*s without ARTRY*).

Master Processor 1 has ordered itself: a) Read Expansion Bridge 1, b) Read Expansion Bridge 2. Slave Expansion Bridge 2 has ordered itself: a) Read by Processor 1, b) Read by Expansion Bridge 1. Expansion Bridge 1 has implied ordering due to stalled PCI Bus of: a) Read of Expansion Bridge 2, b) Read by Processor 1. In this scenario, all three devices involved have conflicting completion orders. Although Processor 1's read of the target behind Expansion Bridge 2 can complete on PCI Bus 2, it cannot complete on the ARBus until Processor 1's read of Expansion Bridge 1 has completed. Expansion Bridge 1's read of Expansion Bridge 2 must complete before Processor 1's read of Expansion Bridge 1 can complete. Since Expansion Bridge 2 is ordered to deliver the response to Processor 1's read before delivering the response to Expansion Bridge 1's read, the deadlock results. This is a Type-A LockUp, and is avoided by preventing one master from reading both an expansion bridges. This prevents the response ordering dependencies for the master.

Figure 15:
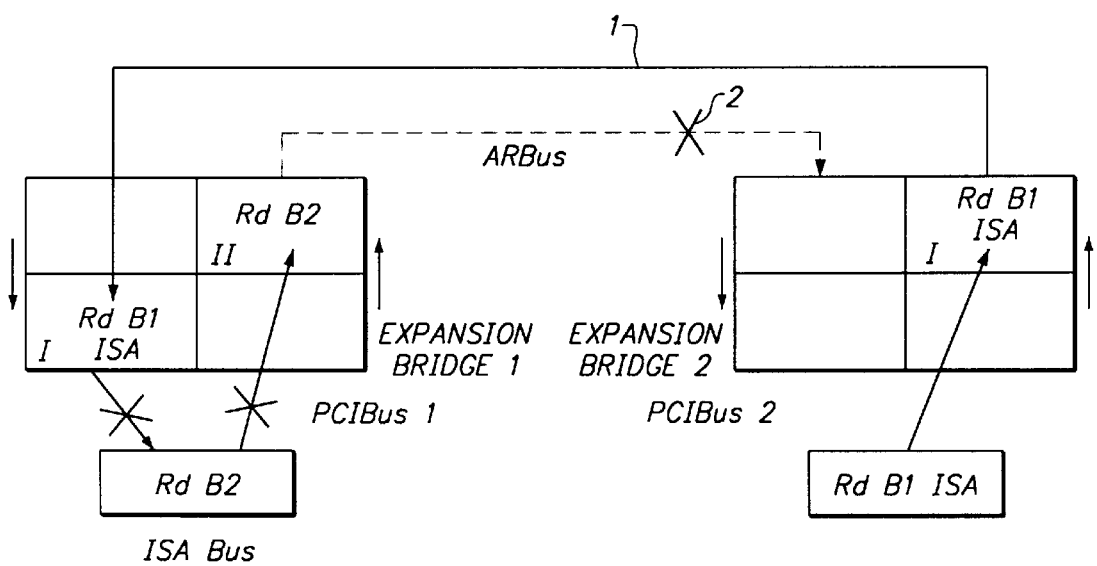
FIG. 15 illustrates a deadlock in which an ISA bus master reads a target behind an opposite expansion bridge.

Referring to FIG. 15, deadlock may occur in the case of an ISA bus master reading a target behind an opposite expansion bridge. A typical sequence of transactions is as follows:

1. PCI Bus 2 Master reads ISA target behind Expansion Bridge 1, stalling PCI Bus 2 (Expansion Bridge 1 AAck*s)
2. ISA Master on ISA initiates read of target behind Expansion Bridge 2. ISA Master cannot be backed off.
3. Expansion Bridge 1 forwards ISA Master's read to Expansion Bridge 2. Expansion Bridge 2 retries Expansion Bridge 1 because PCI Bus 2 Master read is outstanding. This occurs indefinitely.

The fact that the master behind Expansion Bridge 2 got its read AAck*ed by Expansion Bridge 1 on the ARBus prior to the ISA bus master behind Expansion Bridge 1, implies that Expansion Bridge 2's completion order is: 1) Complete read to ISA bus behind Expansion Bridge 1, 2) Accept incoming read from Expansion Bridge 1 (or whomever). However, the ISA bus has initiated an access and will retry all accesses to it until its read of the target behind Expansion Bridge 2 has completed. The ISA bus completion order is: 1) Complete read to target behind Expansion Bridge 2, 2) Accept incoming read from Expansion Bridge 2 (or whomever). These two masters have conflicting completion orders. Note that if PCI Bus 2 had not been stalled by its read and Expansion Bridge 2 could have accepted the read from Expansion Bridge 1, then all transactions would be able to complete. This is a Type-A (PCI Bus 2 stall) and Type-B LockUp (ISA bus block). The fix is to allow ISA bus master cards to communicate only with main memory or targets behind the same expansion bridge. For example, system software may remap accesses across the bridges to memory and complete transfers virtually.

Figure 16:
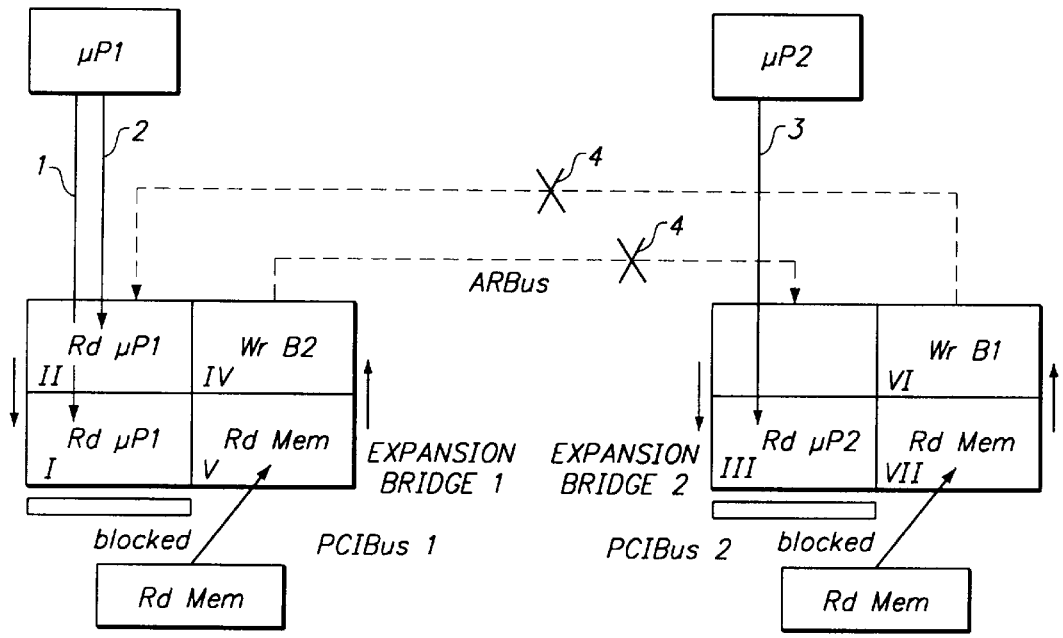
FIG. 16 illustrates a deadlock in which a PCI bus master read gets stuck behind a posted PCI bus master write.

Referring to FIG. 16, deadlock may occur when a PCI bus master read gets stuck behind a posted PCI bus master write. A typical sequence of transactions is as follows:

1. Three transactions: a) Processor 1 Reads Expansion Bridge 1, b) Processor 1 Reads Expansion Bridge 1, c) Processor 2 Reads Expansion Bridge 2.
2. Meanwhile: a) Expansion Bridge 1 has a write transaction destined for Expansion Bridge 2, and a PCI Bus Master on PCI Bus 1 issues a read of memory, stalling PCI Bus 1, b) Expansion Bridge 2 has a write transaction destined for Expansion Bridge 1, and a PCI Bus Master on PCI Bus 2 issues a read of memory, stalling PCI Bus 2.

The normal means to get a PCI Bus Master read to free up the PCI Bus is to retry a transaction from the PCI bus when it cannot be serviced. Normally, the PCI Bus Master read would propagate to the ARBus, attempt its cycle on the ARBus, and either complete or get an ARTRY*. In either event, it frees up the bus. For a high-performance architecture, concurrent reads are desired at all times. The scenario on both PCI buses is that they are stalled with reads heading to memory, but there are write transactions to the opposite expansion bridge in each expansion bridge which cannot complete (because the transaction limit has been reached). Since neither expansion bridge's ARBus master write transactions can complete their address tenure, their respective PCI Bus Master read tenures cannot gain access to the ARBus to complete or receive an ARTRY*. In this instance the PCI buses will remain stalled indefinitely. This is a Type-A LockUp, and is avoided by having an expansion bridge immediately retry PCI Bus master reads if it has a PCI Bus master write transaction queued up in front of it that has not completed. This will ensure that the PCI Bus master read has access to the ARBus to complete the access or receive an ARTRY*.

Figure 17:
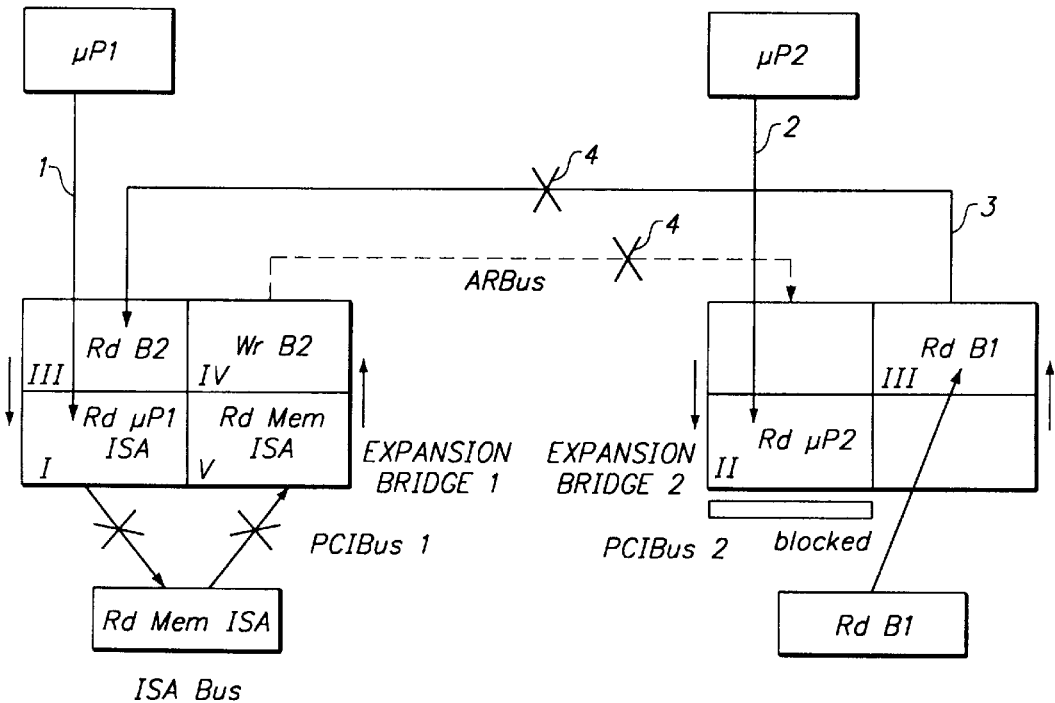
FIG. 17 illustrates a deadlock in which the ARBus transaction limit is hit, and accesses cannot complete.

Referring to FIG. 17, deadlock may occur when the ARBus transaction limit is hit, and accesses cannot complete. A typical sequence of transactions is as follows:

1. Three transactions: a) Processor 1 Reads ISA target behind Expansion Bridge 1, b) Processor 2 Reads target behind Expansion Bridge 2, c) Expansion Bridge 2 Reads target behind Expansion Bridge 1, stalling PCI Bus 2.
2. Meanwhile: a) Expansion Bridge 1 has a write transaction destined for Expansion Bridge 2, and b) an ISA Bus Master has initiated a read access of main memory on the ISA Bus. The ISA bus master cannot be backed off. This ISA bus master access blocks the Processor 1 Read from completing.

The fundamental problem with this scenario is that the transaction queue depths are limited to three transactions. If the depth were four, then the Expansion Bridge 1 write transaction destined for Expansion Bridge 2 could complete, allowing the ISA bus master read of main memory to complete, etc. Given that the transaction queue depths are limited to three transactions, the other two problems to note are that the PCI Bus Master on PCI Bus 2 has stalled its bus with the read of the target behind Expansion Bridge 1 and that the ISA bus master has stalled its ISA bus with the read of main memory. If either bus were not stalled, then either the Processor 2 read of the target behind Expansion Bridge 2 would complete, or the Processor 1 read of the ISA target would complete. This is a Type-A (PCI Bus 2 stall) and Type-B LockUp (ISA bus block). Since neither the PCI Bus 2 stall or the ISA bus block can be prevented, the deadlock is avoided by the ARBus arbiter to prevent Expansion Bridge 2 from reading Expansion Bridge 1 if Expansion Bridge 2 has an outstanding read. In general terms, if an expansion bridge-A has an outstanding ARBus Master's Slave Read, then the ARBus arbiter should prevent (ARTRY*) an expansion bridge-A from reading an expansion bridge-B until the outstanding read has completed.

Figure 18:
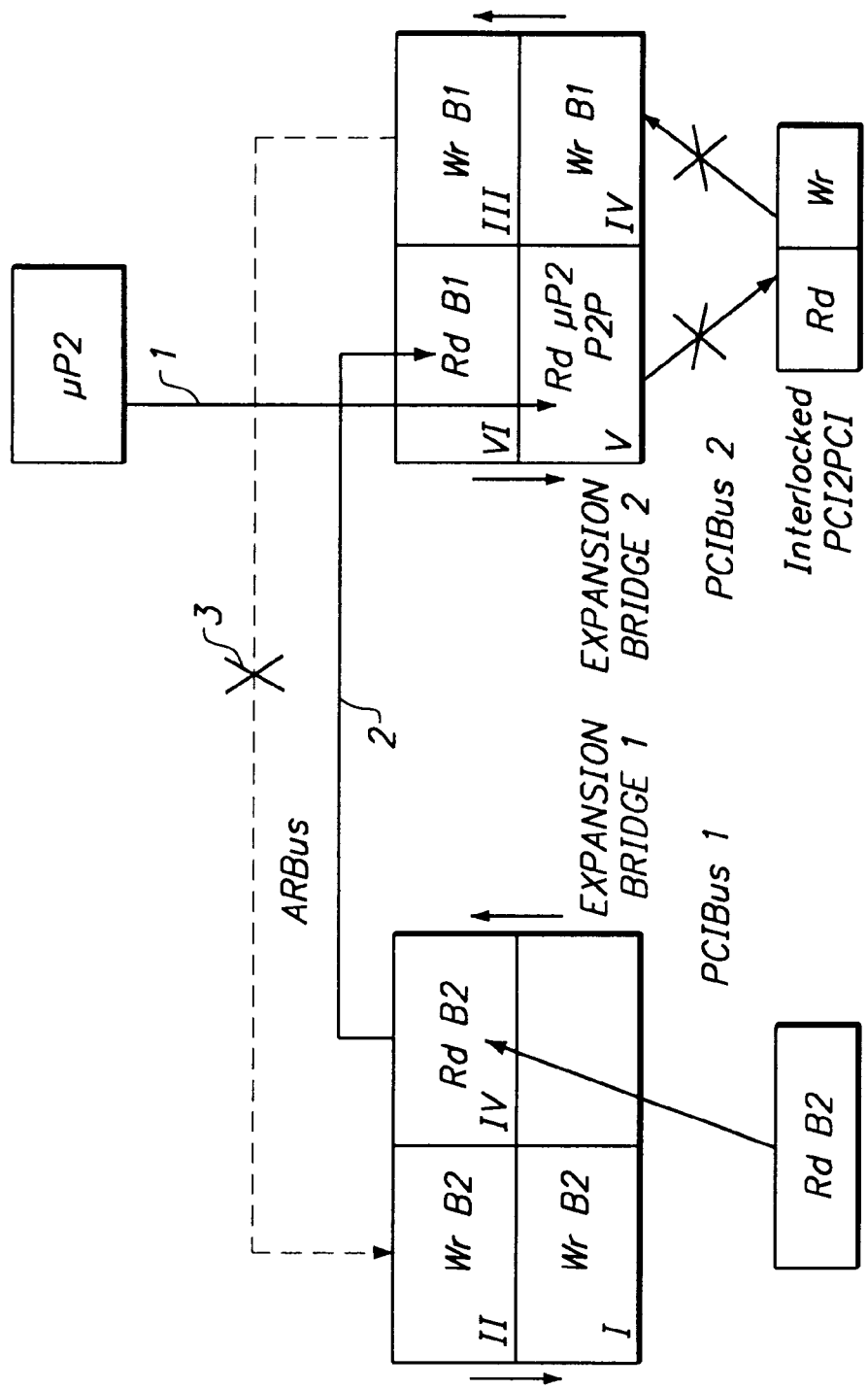
FIG. 18 illustrates a deadlock in which one expansion bridge, with an outstanding ARBus read, accepts a read from another expansion bridge.

Referring to FIG. 18, deadlock may occur when one expansion bridge, with an outstanding ARBus read, accepts a read from another expansion bridge. A typical sequence of transactions is as follows:

1. Expansion Bridge 1 accepts two ARBus to PCI Bus 1 writes. Meanwhile, a PCI Bus Master on PCI Bus 1 has initiated a read access from a target behind Expansion Bridge 2.
2. Expansion Bridge 2 accepts a read from Processor 2 to the PCI2PCI bridge, followed by a read from Expansion Bridge 1. Meanwhile, Expansion Bridge 2 also accepts two PCI Bus to Expansion Bridge 1 write cycles.
3. The Processor 2 read of the PCI2PCI bridge causes the bridge to attempt to flush posted write data to main memory. Since all buffers are filled in the direction of PCI Bus 2 to PCI Bus 1, and PCI Bus 1 is stalled, the PCI2PCI bridge cannot flush its data.

The problem with this scenario is that the two PCI buses have conflicting completion orders. Since Expansion Bridge 2 AAck*ed Expansion Bridge 1's read, PCI Bus 1 has committed to completing the read before allowing any other accesses to occur, thereby stalling the PCI Bus. The Processor 2 read of the PCI2PCI bridge has kicked off the interlocking behavior of the bridge. The PCI2PCI bridge will not service the read until it has completed its writes. Unfortunately, to complete its write, an access must occur on PCI Bus 1 to free up some buffer space. PCI Bus 2 won't service the read until it executes the write, and PCI Bus 1 won't service the write until it completes the read. This is a Type-A (PCI Bus 1 stall) and Type-B LockUp (PCI2PCI bridge block). Since neither the PCI Bus 1 stall or the PCI2PCI bridge block can be prevented, the fix is for the ARBus arbiter to prevent Expansion Bridge 1 from reading Expansion Bridge 2 if Expansion Bridge 2 has an outstanding read. In general terms, if an expansion bridge has an outstanding ARBus master's Slave Read, then the ARBus arbiter should prevent (ARTRY*) another expansion bridge from reading that expansion bridge until the outstanding read has completed.

The following summary is a compilation of the foregoing rules. Items below in italic text are deadlock avoidance rules for which an expansion bridge is responsible, and items below in plain text are deadlock avoidance rules for which the ARBus arbiter or processor bus arbiter is responsible.

A1. The ARBus arbiter must prevent an ARBus master from reading main memory (via ARTRY*) if that master has an outstanding read of an expansion bridge.

A2. The ARBus arbiter must prevent an access by an ARBus master that would cause a second level cache hit or allocate (via ARTRY*) if that master has an outstanding read of an expansion bridge.

A3. The ARBus arbiter must prevent a snooping ARBus master from writing to an expansion bridge if the master has an outstanding read of an expansion bridge to allow for required Snoop Push write transactions. DeadLock Avoidance Rules for Multiple Expansion Bridges, Split Bus, Fixed Priority, Ordered Masters and Slaves:

B1. An expansion bridge must disregard ARBus protocol and take the address tenure if a Bus Grant occurs concurrent with an ARtry*.

B2. An expansion bridge must disregard ARBus protocol and keep its Bus Request asserted the clock following an ARTRY* if it is the source of the ARTRY*.

B3. An expansion bridge must disallow a read of its slave while it has an outstanding master read transaction and its corresponding data tenure has not begun.

B4. The ARBus arbiter must prevent one master from reading both expansion bridges.

B5. ISA bus master cards must not read targets behind the opposite bridge. Software must restrict target accesses from ISA to the same bridge or main memory.

B6. An expansion bridge must retry PCI Bus master reads if it has a PCI Bus master write transaction queued up in front of it that has not completed.

B7. If an expansion bridge has an outstanding ARBus master's Slave Read, the ARBus arbiter must prevent (ARTRY*) that expansion bridge from reading another expansion bridge until the read completes.

B8. If an expansion bridge has an outstanding ARBus master's Slave Read, the ARBus arbiter must prevent (ARTRY*) another expansion bridge from reading that expansion bridge until the read completes.

As noted above, some of the deadlock avoidance rules are implemented in the expansion bridge itself. Others of the deadlock avoidance rules are implemented in the system arbiter. In either case, the general technique employed is to detect a deadlock hazard, a condition which, if a single further "deadlocking" transaction were accepted, would result in deadlock and, if that transaction is requested, refusing to accept it by issuing a retry signal.

Referring again to FIG. 6, a block 613 monitors the state of the master queues 601 to detect a deadlock hazard, and monitors the BG and SACK vectors to detect a deadlocking transaction. When such a transaction is requested, an ARTRY signal is generated, causing the transaction to be backed off instead of being accepted and queued.

Each master queue locally generates two signals, a ValidBr1Rd signal, indicating that the master has a read to Expansion Bridge 1 pending, and a ValidBr2Rd signal, indicating that the master has a read to Expansion Bridge 2 pending. These signals are bussed to the block 613 instead of actual queue entries.

From the foregoing signals, the block 613 detects deadlock hazards. Also input to the block 613 are the BG vector and the SACK vector, which together indicate the master/slave pair for a requested transaction. From the latter signals, the block 613 detects deadlocking transactions and in response generates a ARTRY signal.

Referring again to FIG. 7, in the case of the expansion bridge 700, deadlock avoidance is implemented in an ARBus control block 710 and in a PCIBus control block 720. In particular, an Address Master state machine [AMst601] causes the expansion bridge 700 to disregard the ARBus protocol and take address tenure if a Bus GRant occurs concurrent with an ARTRY signal. Likewise, the Address Master state machine [AMst601] causes the expansion bridge 700 to disregard the ARBus protocol and keep its Bus Request asserted the clock following an ARTRY if it is the source of the ARTRY.

An Address Slave state machine and a PCI Master state machine each implement a further deadlock avoidance rule in similar manner as described previously in relation to the system arbiter. That is, a deadlock hazard is detected, during which if a deadlocking transaction is detected, that transaction is refused. In particular, the Address Slave state machine disallows a read of its slave while it has an outstanding master read transaction and its corresponding data tenure has not begun. The PCI Master state machine retries PCI Bus master reads if it has a PCI Bus master write transaction queued up in front of it that has not completed.

Use of the described deadlock avoidance techniques enables a high-performance split-transaction system bus to be interfaced to a single-envelope expansion bus without compromising system reliability. Rather than the characteristics of the expansion bus limiting the performance of the system bus, performance of the system bus may be separately optimized. As a result, overall system performance is greatly improved.

Increased Efficiency by Allowing Transaction Independence Within Slave Devices

The description thus far has assumed a system in which both masters and slaves are ordered. In particular, the 60X microprocessor assumes that its transactions are ordered. As a consequence, master ordering is to some extent ingrained within the underlying system architecture. Slave ordering, on the other hand, although it may be convenient from an implementation perspective, is not required. Increased efficiency may be achieved by relaxing the constraint of slave ordering, thereby allowing transaction independence within slaves. To achieve unordered slaves, additional information must be exchanged between the slaves and the arbiter. As before, this information may be exchanged in the form of additional side-band signals not provided for by the MPC60X bus specification.

Figure 19:
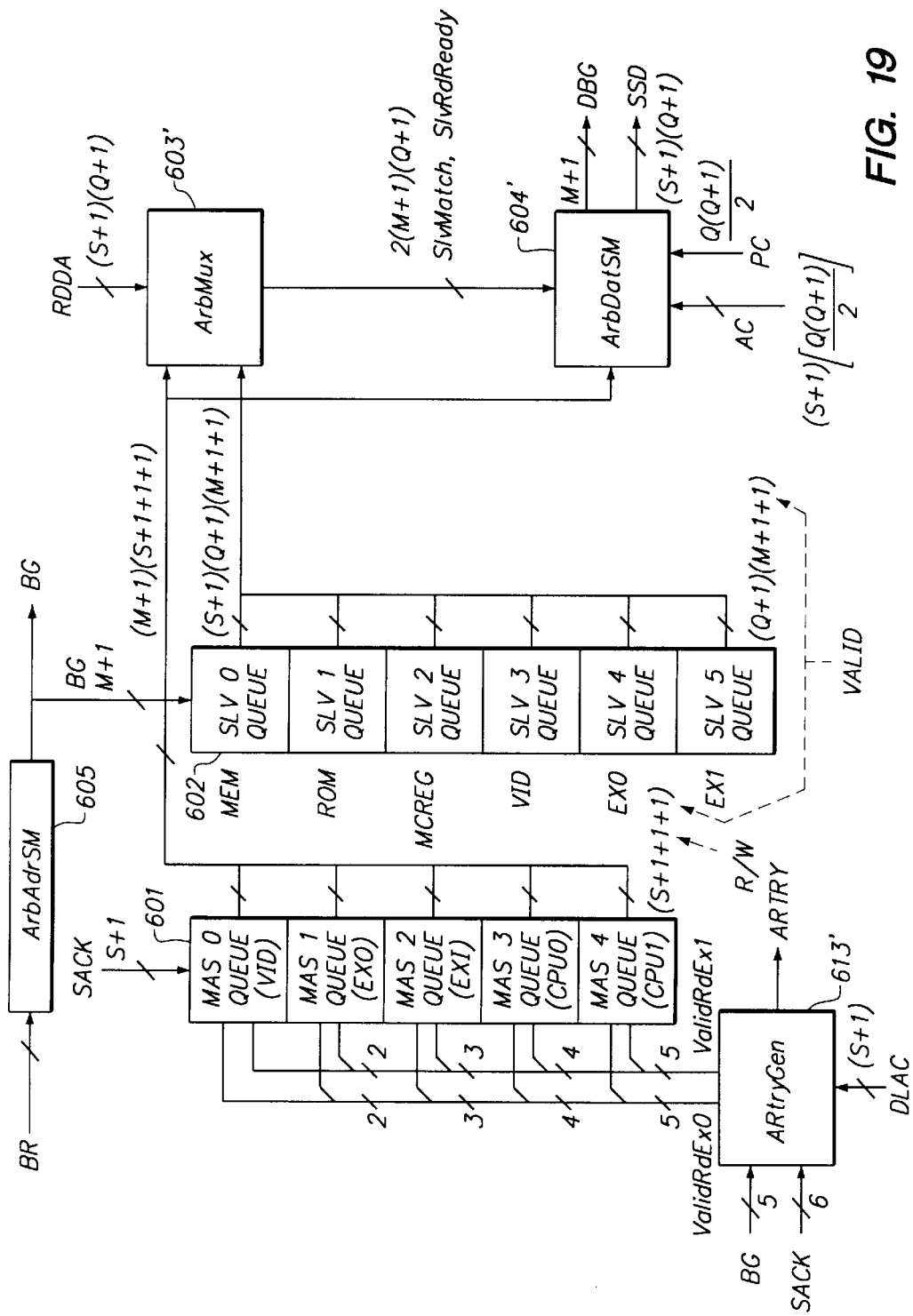
FIG. 19 is a block diagram of another embodiment of the arbiter 600 of FIG. 3.

Referring to FIG. 19, a block diagram is shown of a modified arbiter that allows for unordered slaves. The arbiter of FIG. 19 differs from the arbiter of FIG. 6 principally in the signals input to and output from the blocks ArbMux 603, ArbDatSM 604 and ARtryGen 613, as well as in the logical function of these blocks. In other respects, the arbiter of FIG. 19 and the arbiter of FIG. 6 remain substantially the same. Like designations have therefore been used in FIG. 19 as in FIG. 6, with the ArbMux, ArbDatSM and ARtryGen blocks being differentiated by prime designations 603', 604' and 613', respectively.

Considering first the block ArbMux 603', in order to allow for transaction independence within slaves, the ArbMux 603' receives as inputs all of the queue entries of all of the slave queues (instead of just all of the front entries as in FIG. 6). Therefore, if the masters are numbered 0 through M, the slaves are numbered 0 through S and the queues locations within each slave queue are numbered 0 through Q, then the ArbMux 603' receives (S+1)(M+1+1)(Q+1) bits of information from the slave queues. One of the bits in the expression (M+1+1) is a valid bit that allows for a flop-based queue implementation instead of one requiring random-access memory. In an exemplary embodiment with S=5, M=4, and Q=2, the number of bits received from the slave queues is 6×6×3=108 bits. Since masters remained ordered, the ArbMux 603' continues to receive only the front entries from the master queues, the same as in FIG. 6. In the illustrated embodiment, the ArbMux 603' receives from the master queues (M+1)(S+1+1+1)=5×8=40 bits. As in the case of the slave queue entries, one of the bits in the expression (S+1+1+1) is a valid bit. The extra bit in the expression (S+1+1+1) is a read/write bit as described previously.

Furthermore, the ArbMux 603', instead of receiving only a single RDDA signal from each slave, now receives an RDDA signal for each slave queue entry. In the illustrated embodiment, the ArbMux 603' therefore receives (S+1)(Q+1)=6×3=18 bits.

In the arbiter of FIG. 6, the ArbMux 603 outputs two bits (SlvMatch and SlvRdReady) for each master in the system. The ArbMux 603' of FIG. 19, on the other hand, outputs two bits for each master for each queue location. Hence, the ArbMux 603' outputs 2(M+1)(Q+1) bits which are input to the ArbDatSM 604'. In the illustrated embodiment, the ArbMux 603' outputs 2×5×3=30 bits for input to the ArbDatSM 604'. The front queue entries from each of the master queues are input to the ArbDatSM 604' as before.

The ArbDatSM 604 of FIG. 6 produces two sets of output signals, DBG and SSD. The DBG output signals remain unchanged in the case of the ArbDatSM 604'. One DBG signal is output for each master for a total of M+1 DBG signals. Instead of outputting out a single SSD signal for each slave device, however, the ArbDatSM 604' outputs an SSD signal for each queue location within each slave device, for a total of (S+1)(Q+1) bits (6×3=18 bits in the illustrated embodiment).

The ArbDatSM 604' receives multiple address coincidence (AC) signals from each of the slave devices. In the illustrated embodiment the ArbDatSM 604' receives from each slave device a separate signal for every possible pair of queue entries within the slave device, indicating whether the same cache line is the target of both transactions queued within the pair of queue entries. In general there are Q(Q+1)/2 possible pairs of queue entries within a slave device. The ArbDatSM 604' therefore receives (S+1)[Q(Q+1)/2] total address coincidence bits or, in the illustrated embodiment, 6×2×3/2=18 bits. The ARtryGen block 613', in addition to the BG and SACK vector inputs previously described in relation to the ARtryGen block 613 of FIG. 6, also receives the same address coincidence signals.

In the case of some slave devices, the average latency of the slave device may be reduced by reordering transactions involving the slave device. In the case of DRAM, for example, page mode reads take less time than non-paged reads. Hence, in the embodiment of FIG. 19, the ArbDatSM 604' further receives page coincidence (PC) signals from at least one slave device, i.e., DRAM. The ArbDatSM block 604' receives from the slave device a separate signal for every possible pair of queue entries within the slave device, indicating whether the targets of both transactions queued within the pair of queue entries are within the same page. The ArbDatSM block 604' therefore receives Q(Q+1)/2 total page coincidence bits or, in the illustrated embodiment, 2×3/2=3 bits.

Figure 20:
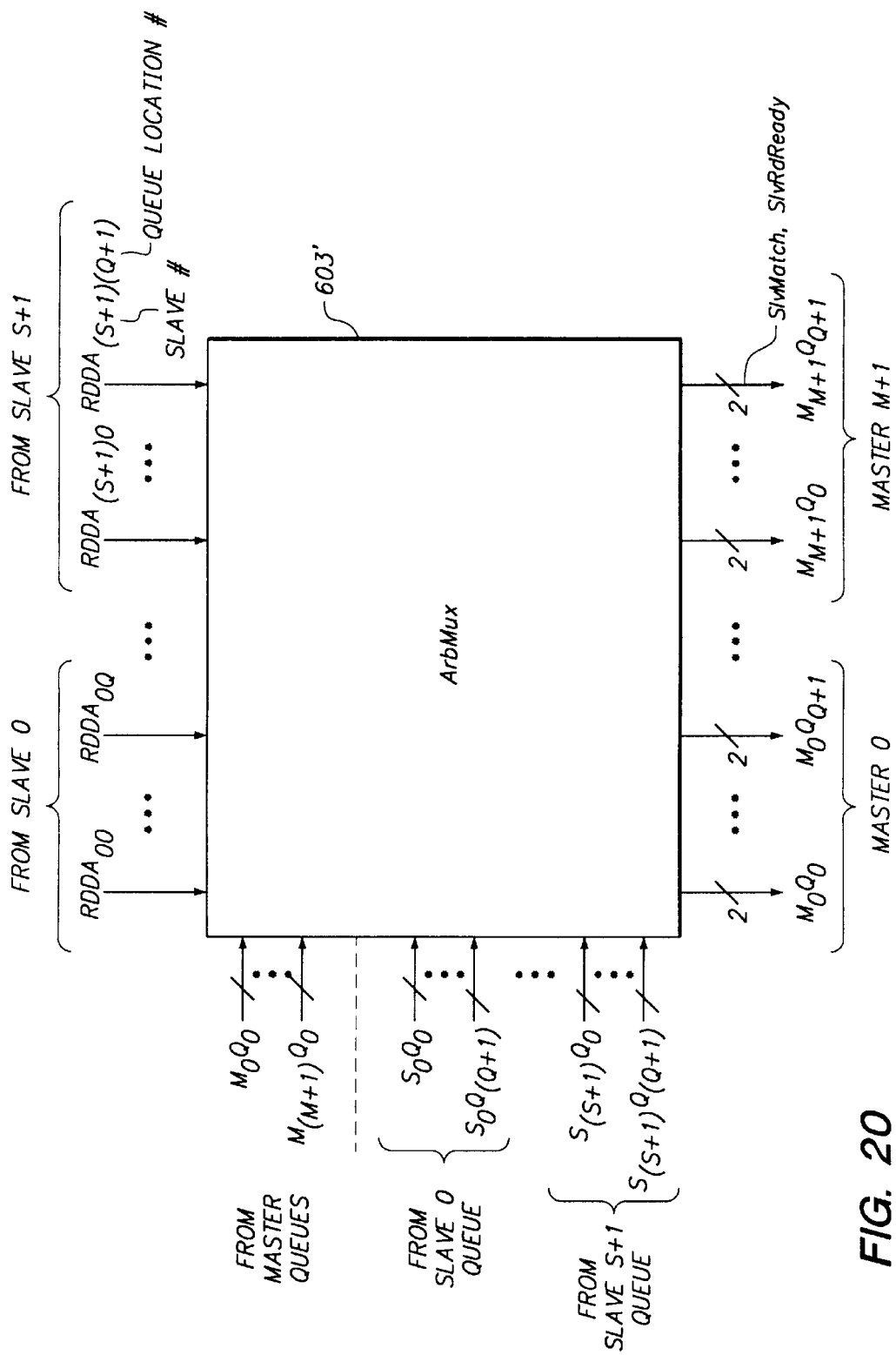
FIG. 20 is a block diagram showing the input and output signals of the ArbMux 603' of FIG. 19.

Referring now to FIG. 20, the inputs and outputs of the ArbMux block 603' are illustrated in greater detail. For each master $M_0$ through $M_{(M+1)}$, the ArbMux 603' receives the frontmost queue entry, represented as $Q_0$. The inputs from the master queues to the ArbMux 603' are therefore represented as $M_0Q_0, M_1Q_0, \ldots, M_{(M+1)}Q_0$.

In the case of the slave queues, every slave queue entry is input into the ArbMux 603'. Hence, for the slave queue $S_0$, inputs to the ArbMux 603' include $S_0Q_0, S_0Q_1, \ldots, S_0Q_{(Q+1)}$, and likewise for each slave queue in sequence up to and including the last slave queue $S_{(S+1)}$, whose inputs include $S_{(S+1)}Q_0, S_{(S+1)}Q_1, \ldots, S_{(S+1)}Q_{(Q+1)}$. The ArbMux 603' receives from the slave devices themselves individual Read Ready signals for each queue location. From Slave 0, therefore, the ArbMux 603' receives $RDDA_{00}$, $RDDA_{01}, \ldots, RDDA_{0(Q+1)}$, and likewise for each slave up to and including the last slave device, Slave S+1, whose inputs include $RDDA_{(S+1)0}, RDDA_{(S+1)1}, \ldots, RDDA_{(S+1)(Q+1)}$.

In FIG. 6, a transaction is allowed to proceed only if it is the frontmost transaction of both the master and the slave. The matching queue location within the slave is by definition always the frontmost valid queue location within the slave. In the case of ArbMux 603 of FIG. 6, therefore, its function is to identify masters whose next transaction in order is also the next transaction in order of the target slave device. In the case of the ArbMux 603' of FIG. 19, slave ordering is no longer required. Hence, the function of the ArbMux 603' is to identify for each master the queue location within the target slave that matches the frontmost transaction of the master. The ArbMux 603' also indicates whether transaction data for that queue location is ready. Hence, for each master, two bits, a SlvMatch bit and a SlvRdReady bit, are output for each queue location. In the case of master $M_0$, the bit pairs output by the ArbMux 603' are designated $M_0Q_0, M_0Q_1, \ldots, M_0Q_{(Q+1)}$, and likewise for each succeeding master up to and including the last master $M_{(M+1)}$, the outputs for which are $M_{(M+1)}Q_0, M_{(M+1)}Q_1, \ldots, M_{(M+1)}Q_{(Q+1)}$. If a master has a valid transaction in its queue, then for the frontmost valid transaction, the SlvMatch signal for that master that corresponds to the matching target slave queue location will be asserted. If the master has no valid transaction in its queue, then no signal is asserted for that master.

Figure 21:
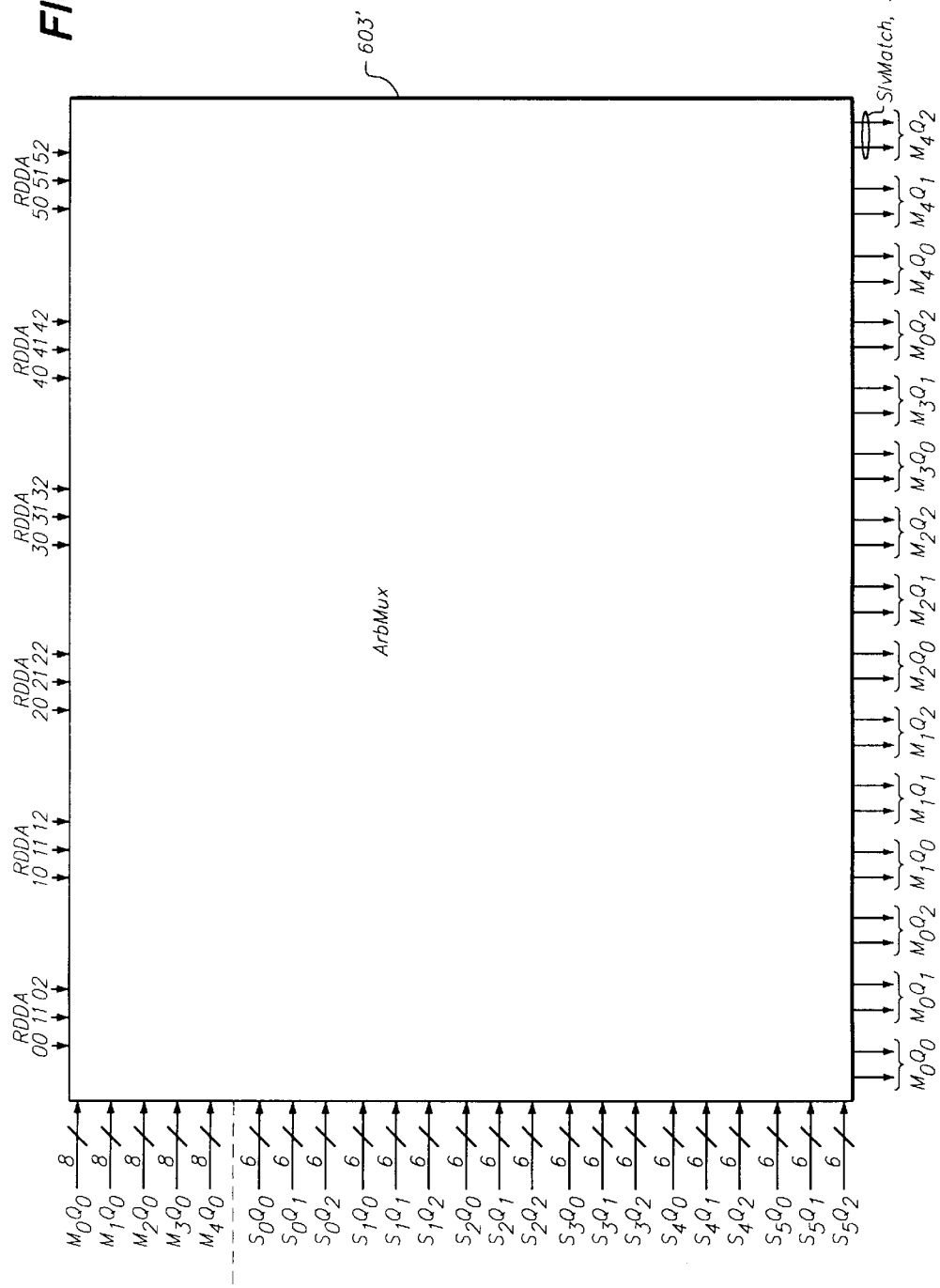
FIG. 21 is a block diagram showing the input and output signals of the ArbMux 603' of FIG. 19 in greater detail.

The inputs and outputs of ArbMux 603' are illustrated in greater detail in FIG. 21 for the case M=4, S=5 and Q=2.

Figure 22:
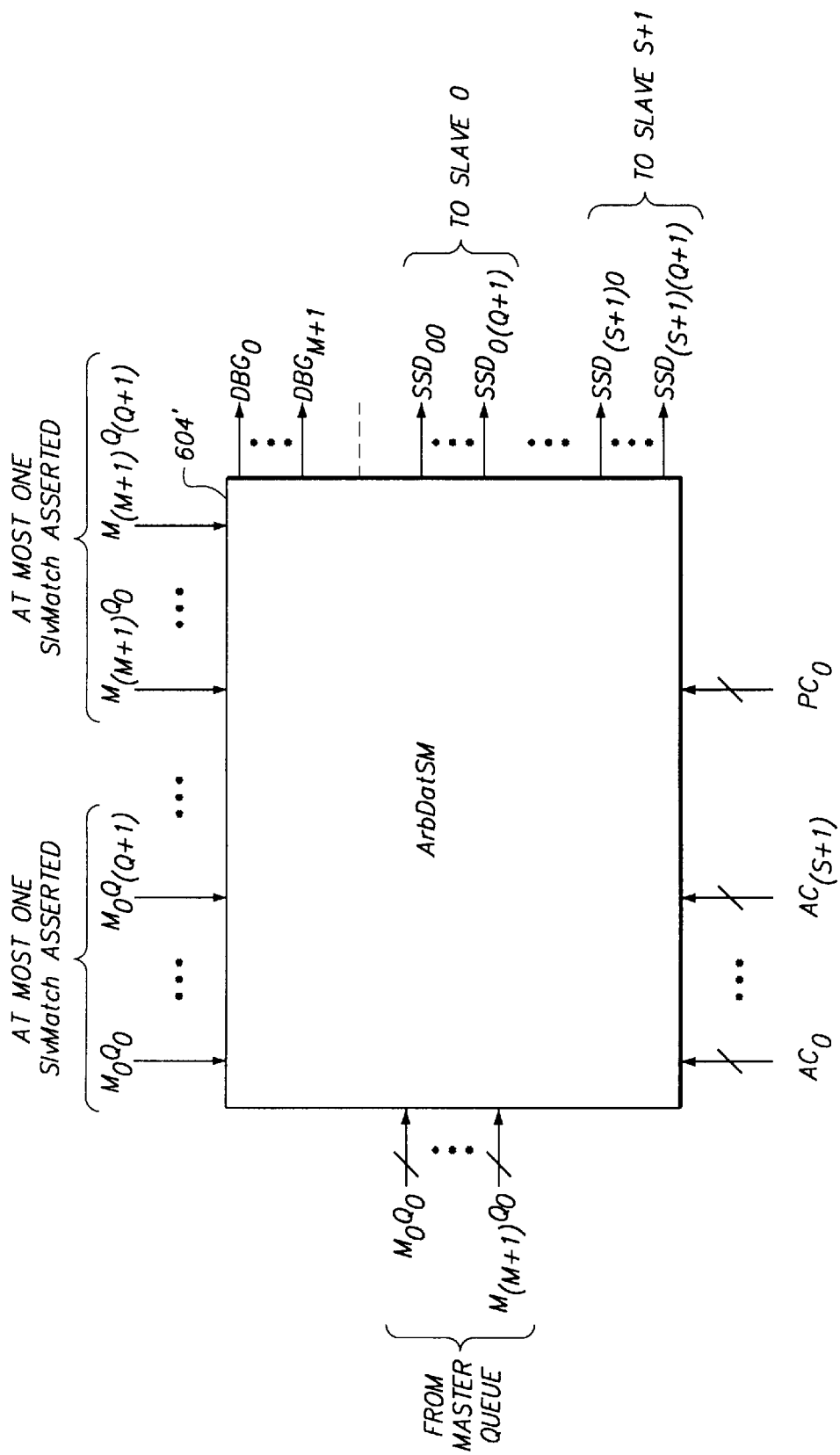
FIG. 22 is a block diagram showing the input and output signals of the ArbDatSM 604' of FIG. 19.

Referring to FIG. 22, the inputs and outputs of the ArbDatSM 604' are illustrated in greater detail. The outputs of the ArbMux 603' described previously are shown as being input to the ArbDatSM 604' at a top edge thereof. These inputs are used by the ArbDatSM 604' to determine which master is to be granted the bus by asserting one of the Data Bus Grant signals $DBG_0$ through $DBG_{M+1}$ output by the ArbDatSM 604'. The same inputs are also used by the ArbDatSM 604' to determine which SSD signal of the target slave is to be asserted according to the queue location that the transaction occupies within the slave queue. Which slave is in fact the target slave is identified by the frontmost master queue entries, shown as being input to the ArbDatSM 604' at a left edge thereof in like manner as in FIG. 6.

The ArbDatSM 604' outputs an SSD signal corresponding to each slave queue location. Hence, for Slave 0, the outputs of the ArbDatSM 604' include $SSD_{00}, SSD_{01}, \ldots, SSD_{0(Q+1)}$, and so forth for each slave up to and including Slave S+1, the outputs for which include $SSD_{(S+1)0}, SSD_{(S+1)1}, \ldots, SSD_{(S+1)(Q+1)}$.

The inputs to the bottom edge of the ArbDatSM 604' are used by the ArbDatSM 604' to ensure that data dependencies are observed and to realize a further optimization as described more fully hereinafter.

In its basic operation, the ArbDatSM 604' performs the following functions:

1. Determines the highest priority master having a transaction "ready to go" based on:
   a) the SlvMatch bits for all of the masters;
   b) the read/write bits from the frontmost queue locations of all of the master queues; and
   c) the SlvRdReady bits for all of the masters.

2. Asserts the corresponding DBG signal for the winning master; and
3. Asserts the correct SSD signal for the target slave based on:
   a) the SlvMatch bits for the winning master; and
   b) the SACK vector in the frontmost queue location of the winning master.

As may be appreciated from the foregoing description, the system of FIG. 19 is much more loosely coupled than the system of FIG. 6. The loosely-coupled nature of the system of FIG. 19 may be taken advantage of to improve the way in which deadlocks are avoided.

As previously described in relation to FIG. 6, slave ordering is a major cause of deadlock. When what would otherwise be a deadlocking transaction is detected, it is "killed" by issuing an ARtry signal. Without slave ordering, a large proportion of what would otherwise be deadlocking transactions, instead of being killed, can now be accepted and reordered in relation to other transactions so as to avoid deadlock. Such reordering is not possible, however, when a data dependency exists. For example, a read of one data location by one device followed by a write of the same data location by another device does not yield the same result as if the execution order is reversed. If a deadlock situation cannot be avoided by transaction reordering because of a data dependency, the need remains to kill the deadlocking transaction.

Of course, data dependencies may also exist absent any potential deadlock situation. Observing such data dependencies will not cause any transaction to be killed as in a deadlock situation, although it may reduce somewhat the utilization of the bus.

Information regarding data dependencies is input to the ArbDatSM 604' in the form of address coincidence (AC) signals from each of the slaves. Using this information, the ArbDatSM 604' schedules transactions so as to observe all data dependencies. For each of slave devices 0 to S+1, the ArbDatSM 604' receives Q(Q+1)/2 address coincidence bits. In the case of Q=2, for example, the ArbDatSM 604' receives three address coincidence bits from each slave: $AC_{01}$, $AC_{02}$, and $AC_{12}$, each indicating that the two subscripted queue locations have target addresses within the same cache line.

In operation, the ArbDatSM 604' uses the address coincidence signals as follows:
1. The ArbDatSM selects for each master a set of address coincidence bits from a particular slave in accordance with the SACK vectors at the head of the respective master queues.
2. Each selected set of address coincidence bits is used to determine for that particular slave device which queue location or locations cannot have the transaction queued therein go next without violating a data dependency.
3. For each master, the SlvMatch bits input to the ArbDatSM are modified in accordance with the results of Step 2 to turn off selected SlvMatch bits, if necessary, in order to ensure that data dependencies are observed.

To take a concrete example, assume that the frontmost queue entry for Master 0 designates Slave 0. Assume further that the SlvMatch bits for Master 0 are 010, indicating that the match is for queue entry 1 of Slave 0. Without taking into account the address coincidence bits of Slave 0, the transaction in queue entry 1 will be executed if Master 0 is the winning master. Now assume that the address coincidence bits of Slave 0 are 100, indicating that the transactions within queue locations 0 and 1 are directed to the same cache line. A data dependency therefore exists between the transactions such that they must be executed in order. To prevent the transaction in queue entry 1 from being executed before the transaction in queue entry 0, the SlvMatch bits of Master 0 are modified, e.g., changed from 010 to 000. The same modification is performed for each arbitration cycle until the transaction in queue entry 0 has executed. The address coincidence bits for Slave 0 will then be 000. The SlvMatch bits of Master 0 then, instead of being modified, remain 010 such that the transaction in queue entry 1 may be executed next if Master 0 is the winning master.

The ArbDatSM 604' uses the page coincidence (PC) bits in a similar manner, not to enforce data dependencies but to reduce slave latency and boost system performance. In the illustrated embodiment, PC bits are received from DRAM only. In other embodiments, PC bits may be received from other or additional slave devices. The slave device is responsible, once a PC bit has been asserted, to keep that PC bit asserted until both of the page-coincident transactions have been executed (or, more precisely, scheduled for execution).

In operation, the ArbDatSM 604' determines to which masters the PC bits will be applied, e.g., which masters have a DRAM transaction at the front of their queues, in accordance with the SACK vectors at the head of the master queues. The PC bits are then used to determine which queue locations cannot have the transactions queued therein go next without forfeiting the speed advantage to be gained from paged access. In practice, if a PC bit is asserted, the transactions to which the PC bit relates will be scheduled for execution prior to any other transactions involving the DRAM. In other words, if the DRAM has three transactions queued, two of which are to the same page, the execution order will be COINCIDENT, COINCIDENT, NON-COINCIDENT, instead of NON-COINCIDENT, COINCIDENT, COINCIDENT, although both sequences yield the same speed advantage. In other embodiments, any execution order that results in the page-coincident transactions being executed one after another without any intervening transaction may be acceptable for purposes of the PC bits.

Figure 23:
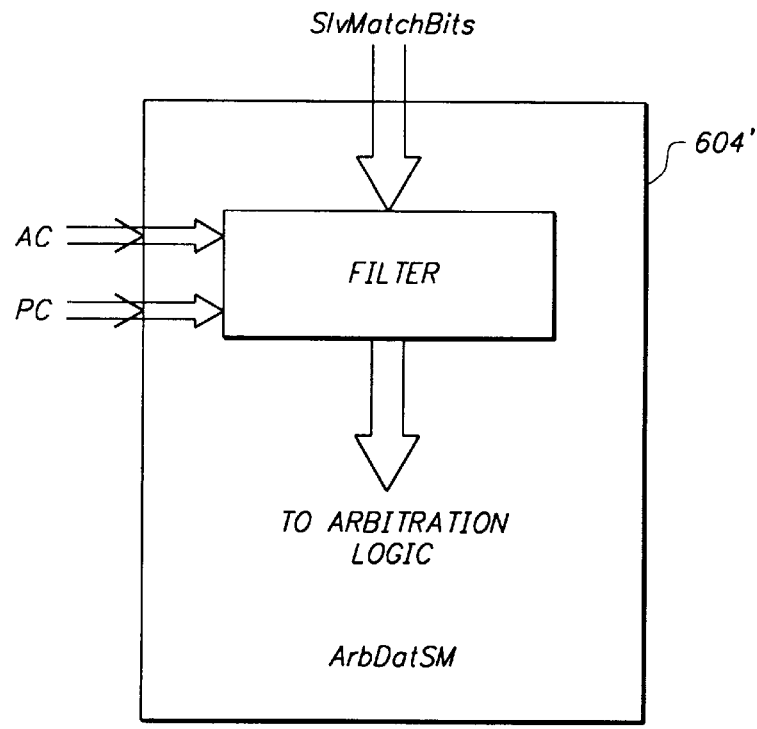
FIG. 23 is a block diagram of a bit filter portion of the ArbDatSM 604' of FIG. 19.

The AC and PC bits may be regarded as control inputs to a bit filter that operates upon the SlvMatch bits, as shown in FIG. 23.

Figure 24:
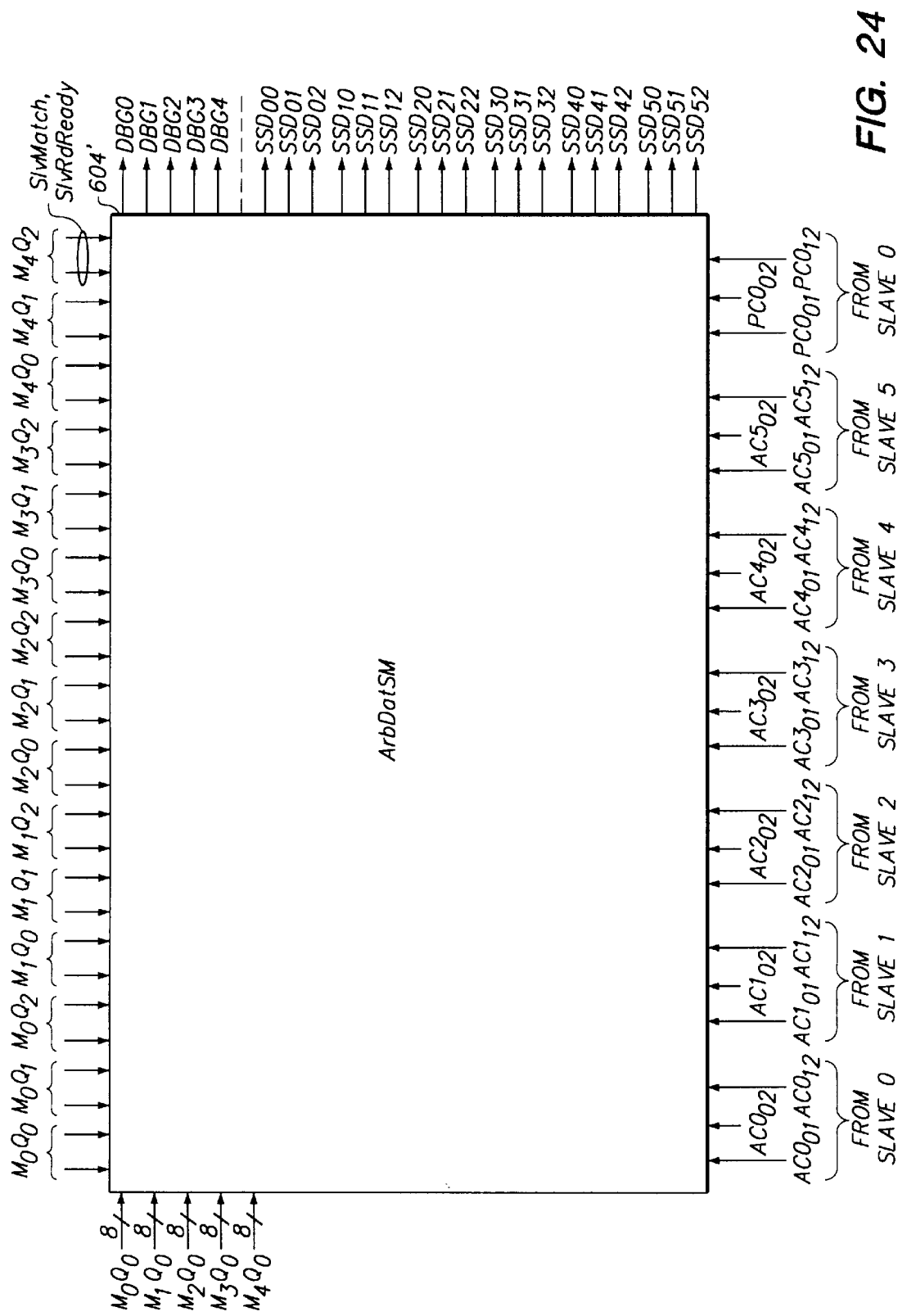
FIG. 24 is a block diagram showing the input and output signals of the ArbDatSM 604' of FIG. 19 in greater detail.

The inputs and outputs of ArbDatSM 604' are illustrated in greater detail in FIG. 24 for the case M=4, S=5 and Q=2.

Figure 25:
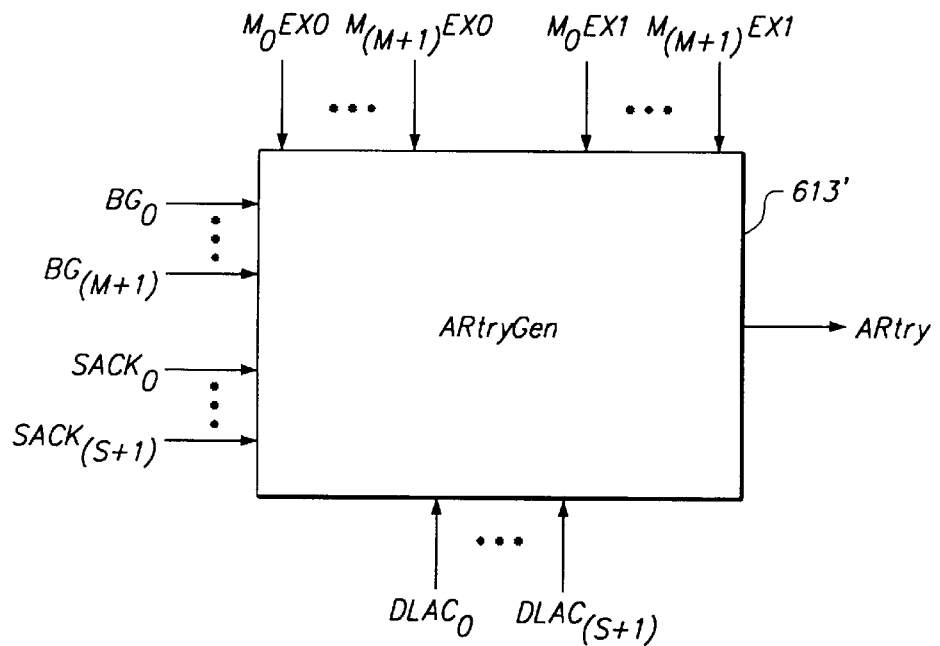
FIG. 25 is a block diagram showing the input and output signals of the ARtryGen block 613' of FIG. 19.

Referring to FIG. 25, the inputs and outputs of the ARtryGen block 613' are illustrated in greater detail. The inputs along the top and left edges of the ARtryGen block 613' remain unchanged compared to the ARtryGen block 613 of FIG. 6. Unlike the ARtryGen block 613 of FIG. 6, however, the ARtryGen block 613', instead of generating ARtry based on the assumption of ordered slaves, uses certain deadlock address-coincidence (DLAC) inputs received at the bottom edge of the block to generate a "qualified" ARtry signal only when a data dependency prevents transactions from being reordered so as to avoid the deadlock. The slave devices each monitor each system bus address tenure and compare the address placed on the bus to addresses queued within the respective slave devices. If the address on the bus is the same as an address already queued within the slave device, the slave device raises its DLAC signal to the ARtryGen block 613'. All slave devices or only selected slave devices (most importantly DRAM) may monitor the bus and signal the ARtryGen block 613' in this manner. In the illustrated embodiment, all slave devices are assumed to provide a DLAC signal. The ARtryGen block 613' therefore receives signals $DLAC_0$ through $DLAC_{(S+1)}$.

In operation, when the ARtryGen block 613' detects a potential deadlocking transaction to a particular slave device, it checks to see if the DLAC bit for that slave device is asserted. If the DLAC bit for that slave is not asserted, then no ARtry signal is generated. If the DLAC bit for that slave device is asserted, then an ARtry signal is generated.

Figure 26:
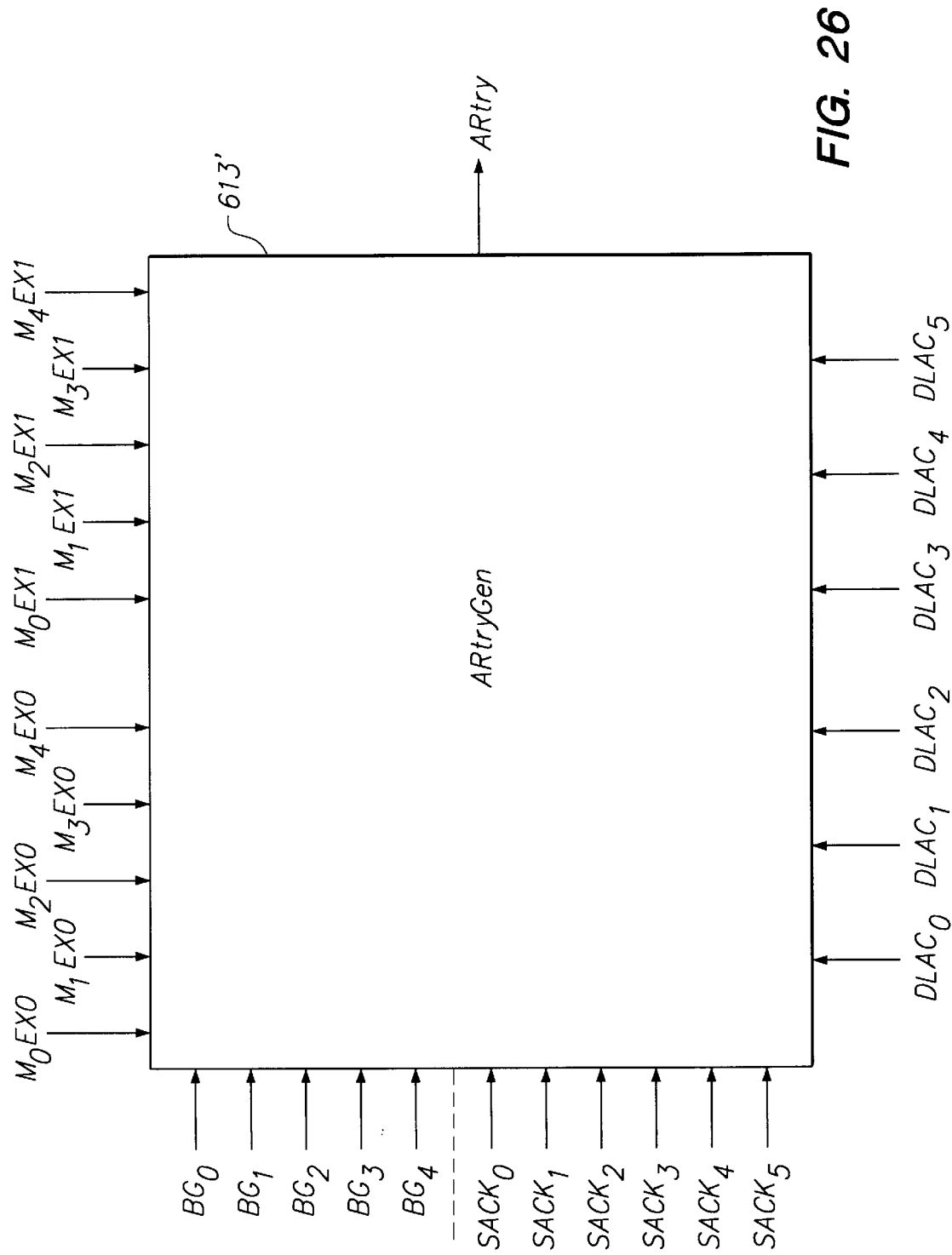
FIG. 26 is a block diagram showing the input and output signals of the ARtryGen bock 613' of FIG. 19 in greater detail.

The inputs and outputs of ARtryGen block 613' are illustrated in greater detail in FIG. 26 for the case M=4, S=5 and Q=2.

It will be apparent to those of ordinary skill in the art that the present invention may be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

I claim:

1. In a computer system having a system bus and having arbitration circuitry, multiple master devices including a system microprocessor, and multiple slave devices, all coupled to the system bus, a method of reordering system bus transactions, comprising the steps of:

receiving and queuing within a particular slave device a plurality of transactions;

within said arbitration circuitry, arbitrating between pending transactions based on arbitration policies including an arbitration policy that responses are received by respective master devices in the same order as requests were issued by the respective master devices; and at least some of the time, said arbitration circuitry, without signalling said microprocessor, signalling said particular slave device such that the system bus is granted for a later queued transaction within said particular slave device prior to being granted for an earlier queued transaction.

2. The method of claim 1, comprising the further step of maintaining for each master device a master queue in which respective queue entries identify respective target slave devices, and maintaining for each slave device a slave queue in which respective queue entries identify respective originating master devices.

3. The method of claim 2, wherein the step of arbitrating further comprises identifying a winning master device based at least in part on a priority ordering of said master devices, and determining for at least said winning master device a matching queue entry within a slave queue identified by a frontmost queue entry within the master queue of the winning master device, the matching queue entry identifying the winning master device.

4. The method of claim 3, wherein the step of signalling said particular slave device comprises signalling to the particular slave device the matching queue entry identifying the winning master device.

5. The method of claim 4, comprising the further step of the slave devices identifying to the arbitration circuitry pairs of transactions involving the same address block.

6. The method of claim 5, wherein the arbitration circuitry, in identifying the winning master device, ensures that for each pair of transactions identified by the slave devices, a corresponding earlier queued transaction is executed prior to a corresponding later queued transaction.

7. A computer system comprising:

a system bus;

multiple master devices, including a system microprocessor, each coupled to the system bus;

multiple slave devices each coupled to the system bus and each comprising a transaction queue for queuing multiple transactions; and arbitration circuitry coupled to the system bus and separately coupled to the multiple slave devices for, without signalling said microprocessor, signalling a particular slave device such that within said particular slave device a later queued transaction is executed prior to an earlier queued transaction.

8. The apparatus of claim 7, wherein said arbitration circuitry comprises:

multiple master queues, each corresponding to one of said master devices, in which respective queue entries identify respective target slave devices;

multiple slave queues, each corresponding to one of said slave devices, in which respective queue entries identify respective originating master devices;

means for determining a winning master device based at least in part on a priority ordering of said master devices; and means for determining for at least the winning master device a matching queue entry within a slave device identified by a frontmost queue entry within the master queue of the winning master device, the matching queue entry identifying the winning master device.

9. An arbiter comprising:

an address arbitration circuit for receiving bus request signals from multiple master devices and in response thereto generating address bus grant signals for the master devices;

a queuing structure including multiple master queues, each corresponding to one of the master devices, and multiple slave queues, each one corresponding to one of multiple slave devices each having a transaction queue, the queuing structure receiving the bus grant signals and receiving respective slave acknowledge signals from respective slave devices, wherein each time an address bus grant is issued a record is entered in the queuing structure, the record comprising a first entry in a master queue identified by the address bus grant signals, the first entry identifying a target slave device in accordance with the slave acknowledge signals, and a second entry in a slave queue identified by the slave acknowledge signals, the second entry identifying an originating master device in accordance with the address bus grant signals;

a matching circuit responsive to queue entries from the queuing structure for producing match bits identifying selected records the first entry of which is at the head of a master queue; and a data arbitration circuit responsive to the match bits and to queue entries from the queuing structure for generating data bus grant signals for the master devices and for generating for each slave device a multibit signal which when active identifies a transaction within the transaction queue of the slave device.

10. The apparatus of claim 9, wherein said selected records include all records within the queuing structure the first entry of which is at the head of a master queue.

11. The apparatus of claim 10, wherein the match bits partially identify said selected records, entries at the head of the master queues being used in combination with the match bits to uniquely identify the selected records.

12. The apparatus of claim 11, wherein the matching circuit is responsive to read-ready signals from the slave devices for producing read-ready bits in one-to-one correspondence with the match bits.

13. The apparatus of claim 12, wherein the matching circuit produces a match bit and a read-ready bit for each queue location of the slave device transaction queues.

14. The apparatus of claim 12, wherein the data arbitration circuit produces a signal bit for each queue location of the slave device transaction queues.

15. The apparatus of claim 12, wherein the data arbitration circuit comprises a bit filter and is responsive to address coincidence signals from the slave devices for filtering the match bits prior to selecting a winning master device.

16. The apparatus of claim 15, wherein the address coincidence signals identify pairs of transactions involving the same block of addresses.

17. The apparatus of claim 16, wherein the data arbitration circuit ensures that for each pair of transactions identified by the slave devices, a corresponding earlier queued transaction is executed prior to a corresponding later queued transaction.

* * * * *